United States Patent
Smith et al.

(10) Patent No.: US 8,992,502 B2
(45) Date of Patent: Mar. 31, 2015

(54) FLEXIBLE STORAGE CONTAINER

(71) Applicant: B. Braun Medical Inc., Bethlehem, PA (US)

(72) Inventors: Steve Smith, Irvine, CA (US); Joachim Beine, Guxhagen (DE); Bill Sperko, Irvine, CA (US)

(73) Assignee: B. Braun Medical, Inc., Bethlehem, PA (US)

( * ) Notice: Subject to any disclaimer, the term of this patent is extended or adjusted under 35 U.S.C. 154(b) by 336 days.

(21) Appl. No.: 13/658,622

(22) Filed: Oct. 23, 2012

(65) Prior Publication Data

US 2013/0046273 A1 Feb. 21, 2013

Related U.S. Application Data

(63) Continuation of application No. 12/182,865, filed on Jul. 30, 2008, now Pat. No. 8,323,259.

(60) Provisional application No. 60/953,153, filed on Jul. 31, 2007.

(51) Int. Cl.
| | |
|---|---|
| *A61M 5/32* | (2006.01) |
| *A61J 1/10* | (2006.01) |
| *A61J 1/14* | (2006.01) |
| *B29C 49/04* | (2006.01) |
| *B29C 47/00* | (2006.01) |
| *B29C 53/16* | (2006.01) |

(Continued)

(52) U.S. Cl.
CPC *A61J 1/10* (2013.01); *A61J 1/1475* (2013.01); *B29C 49/04* (2013.01); *B29C 47/0026* (2013.01); *B29C 47/0054* (2013.01); *B29C 47/0057* (2013.01); *B29C 53/16* (2013.01); *B29C 2791/001* (2013.01); *B29K 2023/0633* (2013.01); *B29K 2023/065* (2013.01); *B29K 2023/12* (2013.01); *B29L 2031/7148* (2013.01)
USPC .......................................... 604/415; 604/414

(58) Field of Classification Search
USPC ........................... 604/403–416; 264/101, 523
See application file for complete search history.

(56) References Cited

U.S. PATENT DOCUMENTS

| | | |
|---|---|---|
| 3,079,919 A | 3/1963 | Harrison et al. |
| 4,561,110 A | 12/1985 | Herbert |

(Continued)

OTHER PUBLICATIONS

International Search Report completed Dec. 22, 2008 and mailed Jan. 2, 2009 from related PCT Application No. PCT/US08/71658, filed Jul. 30, 2008 (4 pages).

(Continued)

*Primary Examiner* — Philip R Wiest
(74) *Attorney, Agent, or Firm* — Klein, O'Neill & Singh, LLP

(57) ABSTRACT

A flexible container for fluid administration is provided having a body defining a cavity, a base, and at least one port comprising a flange in contact with a flange of a terminal port having a punctureable membrane layer. The body has a cross-sectional configuration including a lower body section of a first dimension, a middle body section of a second dimension, and an upper body section of a third dimension, wherein the second dimension is smaller than the first dimension and the third dimension. The flexible container may also include a base having a plurality of creases that are foldable to form two folded ends each including an extension having a base of a first dimension and a tip of a second dimension.

20 Claims, 20 Drawing Sheets

(51) Int. Cl.
*B29K 23/00* (2006.01)
*B29L 31/00* (2006.01)

(56) References Cited

U.S. PATENT DOCUMENTS

| | | | |
|---|---|---|---|
| 5,728,086 | A | 3/1998 | Niedospial, Jr. |
| 6,855,138 | B2 | 2/2005 | Tsai |
| 7,867,204 | B2 | 1/2011 | Bartholomew et al. |
| 2003/0105448 | A1* | 6/2003 | Shiraishi et al. .............. 604/415 |
| 2010/0308251 | A1 | 12/2010 | Pascal et al. |

OTHER PUBLICATIONS

Written Opinion completed Dec. 22, 2008 and mailed Jan. 2, 2009 from related PCT Application No. PCT/US08/71658, filed Jul. 30, 2008 (7 pages).

International Preliminary Report on Patentability completed Feb. 2, 2010 and mailed Feb. 11, 2010 from related PCT Application No. PCT/US08/71658, filed Jul. 30, 2008 (8 pages).

Office Action mailed Dec. 21, 2012 from corresponding U.S. Appl. No. 12/182,865.

Office Action mailed Feb. 1, 2011 from corresponding U.S. Appl. No. 12/182,865.

Final Office Action mailed Jul. 19, 2011 from corresponding U.S. Appl. No. 12/182,865.

Office Action mailed Dec. 7, 2011 from corresponding U.S. Appl. No. 12/182,865.

Notice of Allowance mailed Aug. 1, 2012 from corresponding U.S. Appl. No. 12/182,865.

\* cited by examiner

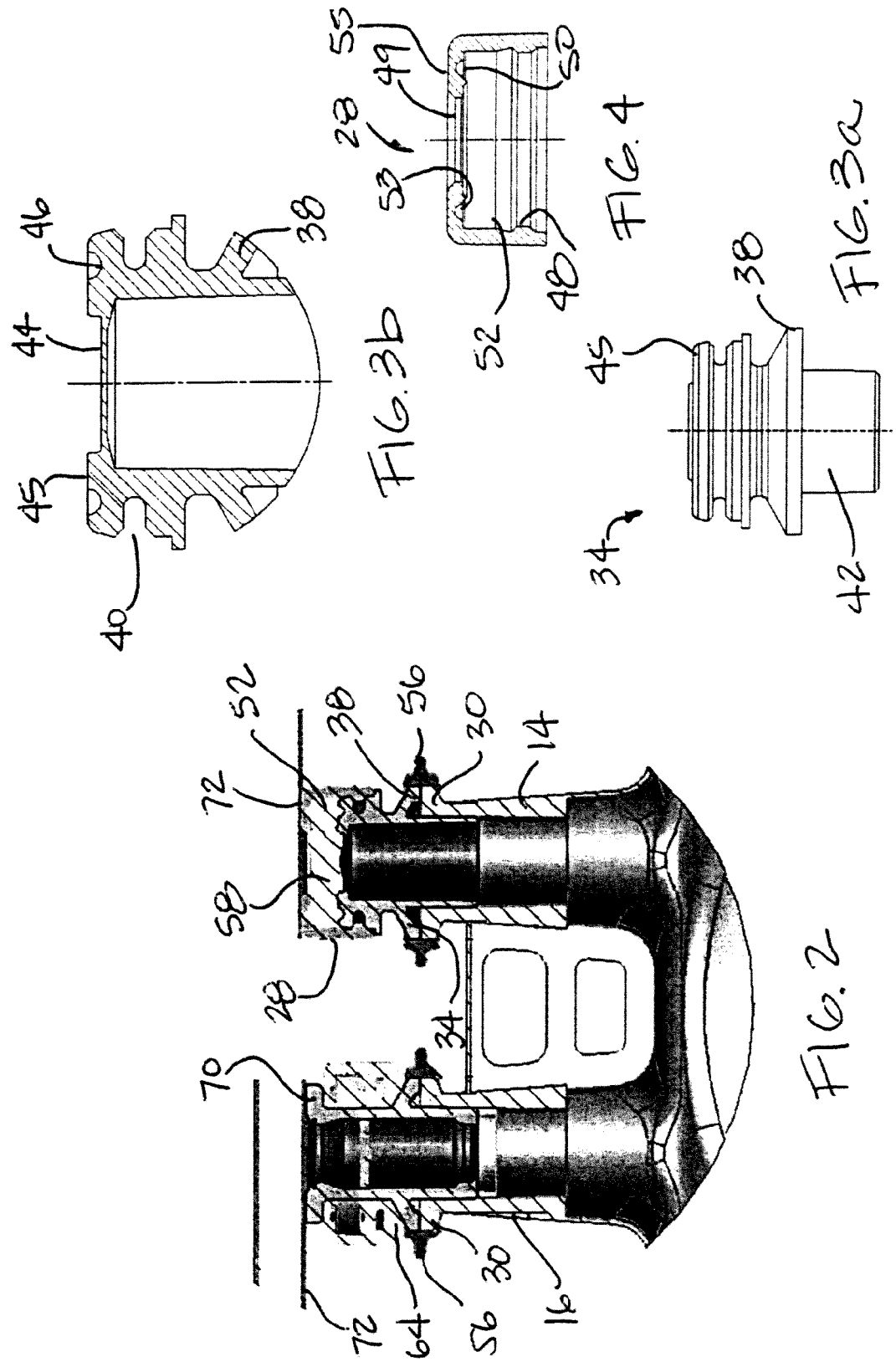

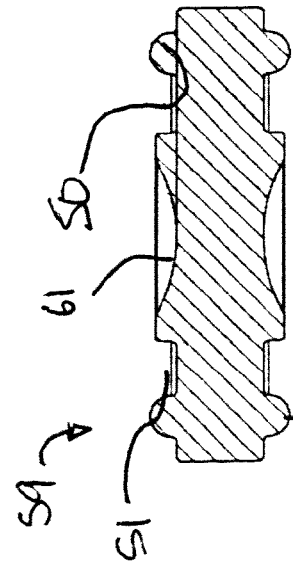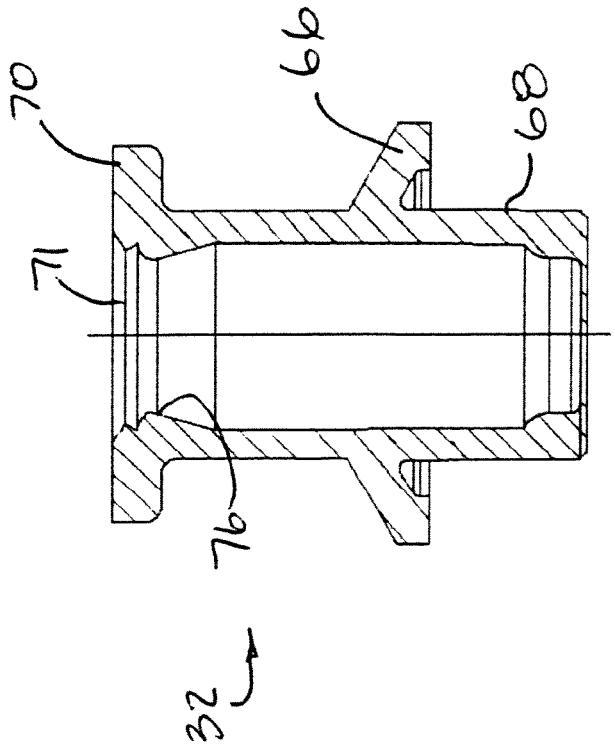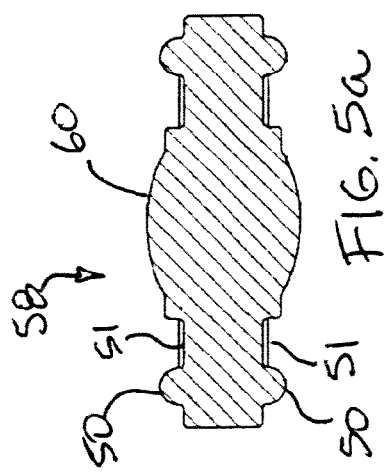

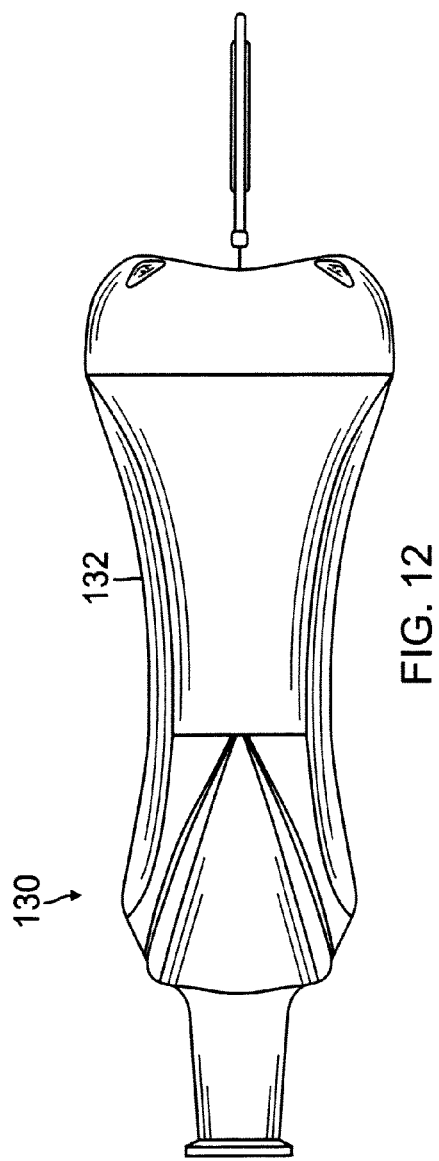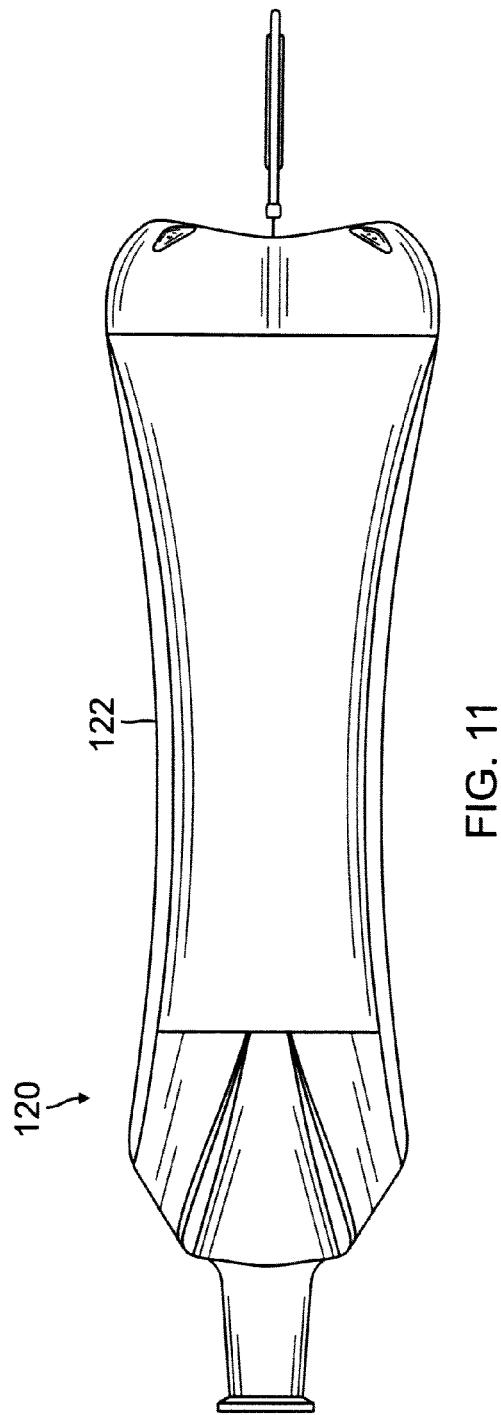

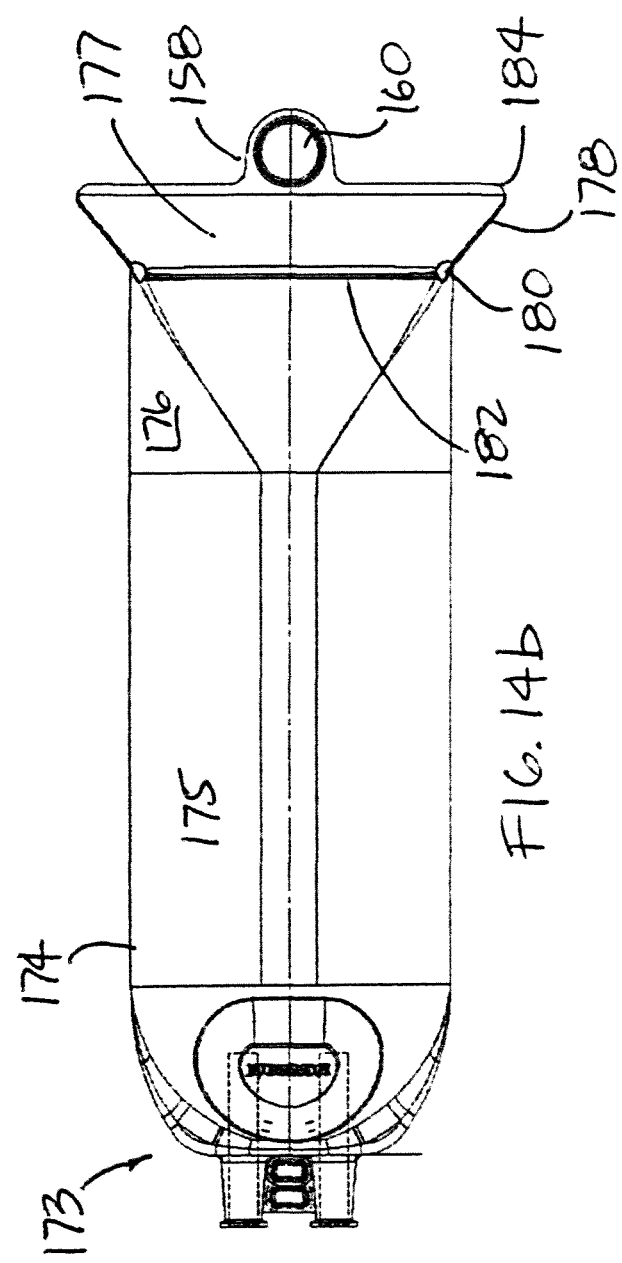

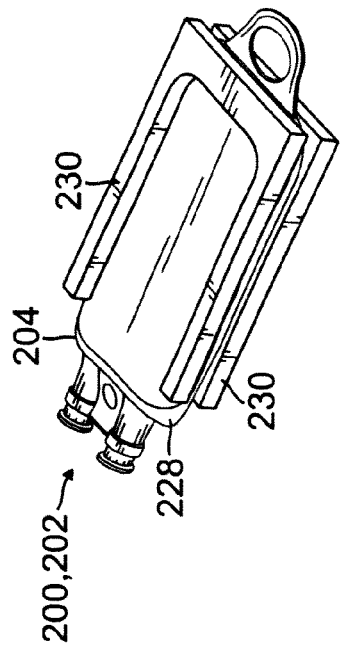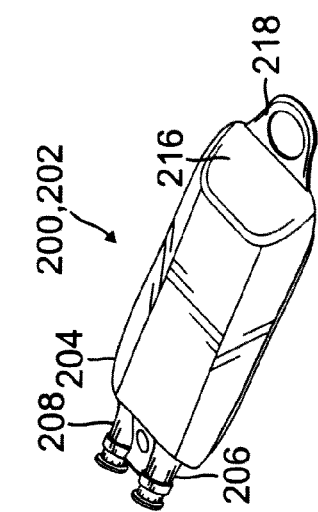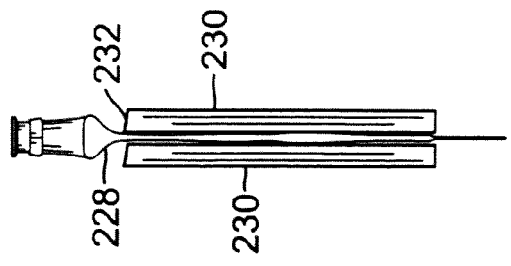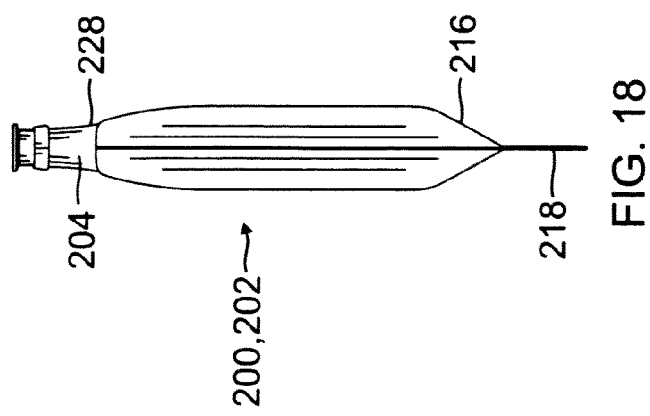

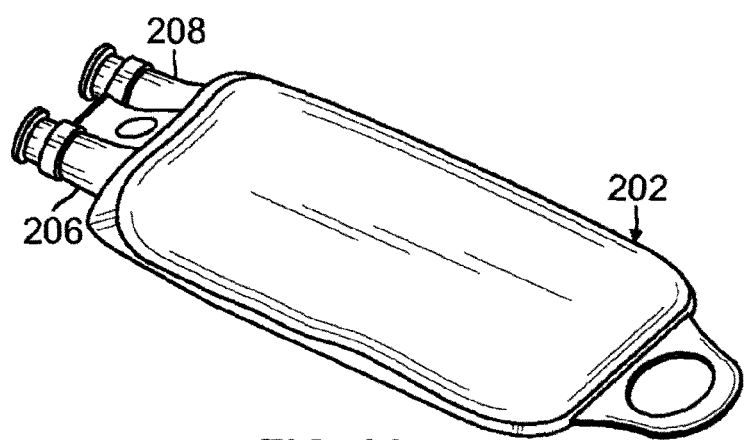
FIG. 22
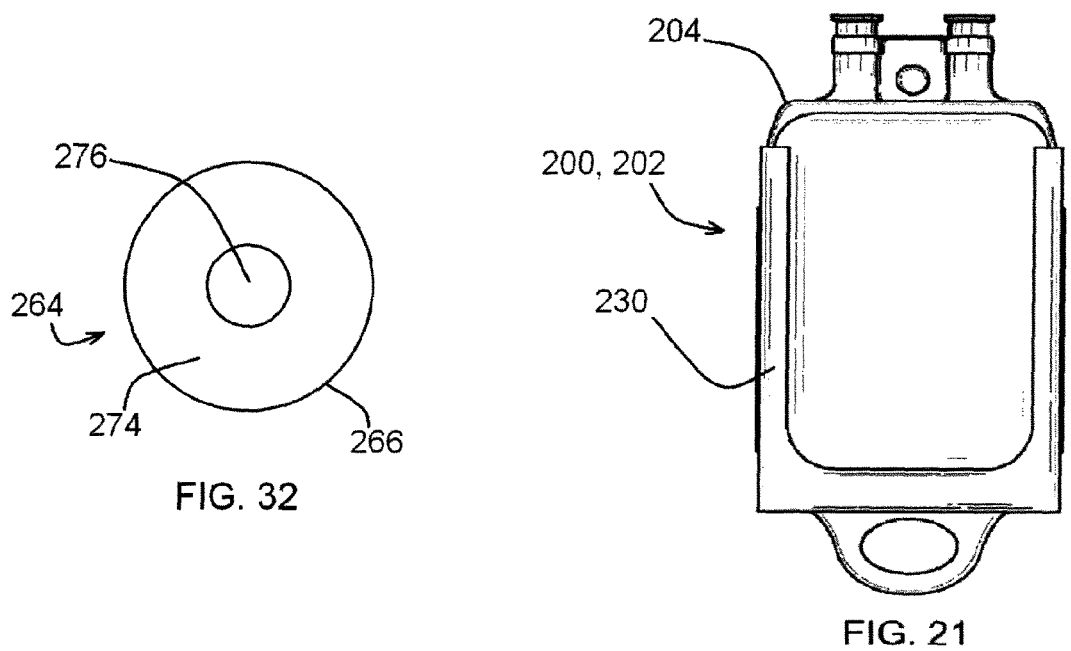
FIG. 32
FIG. 21

FLEXIBLE STORAGE CONTAINER

CROSS-REFERENCE TO RELATED APPLICATION

This is a continuation application of co-pending application Ser. No. 12/182,865, filed Jul. 30, 2008, which is a regular application of provisional application Ser. No. 60/953,153, entitled Flexible Container, filed Jul. 31, 2007, the contents of which are expressly incorporated herein by reference.

FIELD OF ART

A molded container for fluid administration and infusion is generally discussed herein with specific disclosure directed to gravity feed collapsible molded container having a base adapted to stand on its end or hung from a dispensing pole.

BACKGROUND

Containers for dispensing fluids come in many shapes, types and sizes. A typical container includes a vial or a container body, a cap, and a seal for sealing the interface therebetween. The cap may be removable for dispensing the stored fluid or alternatively a separate channel, port, or weakened section provided for dispensing the stored fluid.

For a nutritional or therapeutic container designed for intravenous use, the container further includes means for port access. e.g. for medication additions or withdrawals to the container. This typically involves use of a rubber septum to be punctured by a needle with syringe. Also for drainage, an IV spike access port is present. Prior art filled infusion containers (particularly flexible PVC IV bags) are often laid on their sides during use due to their design, which makes prepping them for use, such as removing the cap or swabbing the ports, somewhat inconvenient.

Most prior art blow molded containers are also designed with a fixed volumetric storage capacity. Thus, it is often difficult to add a supplement or an additive to the prior art containers. Draining such container can also be difficult if the container does not collapse or collapse in a predictable fashion.

Accordingly, there is a need for a port access type container that is easy to make, fill, and seal with low residual air volume that can substantially be drained of fluid without the need for an external pressure applied to the container. There is also a need for a container which can stand on its own to facilitate prepping and one that readily accommodates a supplement or an additive.

SUMMARY

A flexible container for fluid administration is provided capable of hanging on a pole or standing upright on a support. The container comprises a body defining a cavity, a base, and at least one port comprising a flange in contact with a flange of a terminal port. The body comprises a cross-sectional configuration comprising a lower body section of a first dimension, a middle body section of a second dimension, and an upper body section of a third dimension. In certain aspects of the present invention, the second dimension is smaller than the first dimension and the third dimension. The base may include four corners generally located on a plane for standing the container upright on a support.

A method for using a flexible container for fluid administration is also provided including filling a container comprising a body defining a cavity with a first fluid to a first selected volume. The body has a cross-sectional configuration including a lower body section of a first dimension, a middle body section of a second dimension, and an upper body section of a third dimension, wherein the second dimension is smaller than the first dimension and the third dimension. The method further includes enclosing a port in fluid communication with the cavity, adding a second fluid through the port to a second selected volume, and expanding the second dimension a greater amount than the first dimension and the third dimension.

Further provided is a flexible container for fluid administration capable of hanging on a pole or standing upright on a support comprising a body defining a cavity, a base having a hanging tab having an opening, and at least one port comprising a flange in contact with a flange of a terminal port. The base can include a plurality of creases that are foldable to form two folded ends each comprising an extension having opposing exterior surfaces and comprising a base of a first dimension and a tip of a second dimension.

A method for using a flexible container for fluid administration is provided including filling a container including a base having a hanging tab having an opening and at least one port with a fluid to a first volume, wherein the base has a plurality creases. The method further includes folding the plurality of creases to form at least one extension comprising a base of a first dimension and a tip of a second dimension and standing the container on its base.

Further provided is a flexible container for fluid administration having a body defining a cavity, a base having a hanging tab having an opening, and at least one port comprising a flange in contact with a flange of a terminal port comprising a puncturable membrane layer. The terminal port includes one of a groove and a lip matable with a spike having the other of the groove and the lip. The lip and the groove are located such that when the lip is mated with the groove, the spike is sufficiently located within the terminal port to provide fluid to the flexible container.

In its broadest scope, a flexible container provided in accordance with aspects of the present invention comprises a body section defining an interior cavity, a base extending on an end of the body opposite a discharge end, and a port comprising at least one of a cap or a peelable seal.

Another aspect of the present invention is a container comprising a body section, a base, and a nozzle section comprising at least one nozzle attached to a terminal port comprising a housing having a stopper positioned therein; said stopper comprising an outer wall, a central wall, and a gap therebetween; said gap being occupied by a plurality of spaced-apart ribs, each of said plurality of spaced-apart ribs being in contact with both the outer wall and the central wall.

In a further aspect of the present invention, the stopper is made from a self-lubricating silicone material. Alternatively, the stopper is made from polyisoprene material.

In certain embodiments, the self-lubricating silicone material is impregnated with antimicrobial metals.

A method for making a blow-molded container, said method comprising: blowing hot parison against a mold to create an interior cavity for storing fluid and a nozzle end comprising at least one nozzle; removing the container from the mold; said container comprising a plurality of edges connected to a container front wall surface and a container rear wall surface: and reducing a depth profile of the container along the plurality of edges while the container is warmer than ambient temperature.

In certain embodiments, the depth profile of the container along the plurality of edges is reduced using a vacuum source.

In certain other embodiments, the depth profile of the container along the three edges is reduced using a mechanical source, which in a preferred embodiment comprises two opposing clamps.

These and other features of the present invention will be better understood upon review of the drawings and written description.

BRIEF DESCRIPTION OF THE DRAWINGS

FIG. 2 is a detail view of a nozzle assembly according to aspects of the present invention.

FIGS. 3a and 3b are a top view and a cross-sectional view, respectively, of an upper add port according to aspects of the present invention.

FIG. 4 is a cross-sectional view of a cap according to aspects of the present invention.

FIGS. 5a and 5b are a cross-sectional view and a perspective view, respectively, of a septum according to aspects of the present invention.

FIG. 6 is a cross-sectional view of an alternate embodiment of a septum according to aspects of the present invention.

FIG. 7 is a cross-sectional view of a set port according to aspects of the present invention.

FIG. 11 is a side view of another exemplary container having an hourglass shape according to aspects of the present invention.

FIG. 12 is a side view of yet another exemplary container having an hourglass shape according to aspects of the present invention.

FIGS. 14a and 14b are a side view and a top view of another flexible container having a foldable base according to aspects of the present invention.

FIG. 17 is a perspective view of the container of FIG. 15 or 16.

FIG. 18 is a side view of the container of FIG. 17.

FIG. 19 is a perspective view of the container of FIG. 17 interposed between two clamps, which in the embodiment shown are U-shaped in configuration.

FIG. 20 is a side view of the assembly of FIG. 19.

FIG. 21 is a front view of the assembly of FIG. 19.

FIG. 22 is a perspective view of a container that has been compressed by the clamps of FIG. 19 or a container that has flattened by evacuating the air or gas from the container using a vacuum source.

FIG. 32 is a bottom or reversed view of the stopper of FIG. 30.

DETAILED DESCRIPTION

The detailed description set forth below in connection with the appended drawings is intended as a description of the presently preferred embodiments of storage containers provided in accordance with aspects of the present invention and is not intended to represent the only forms in which the present invention may be constructed or utilized. The description sets forth the features and the steps for constructing and using the storage containers of the present invention in connection with the illustrated embodiments. It is to be understood, however, that the same or equivalent functions and structures may be accomplished by different embodiments that are also intended to be encompassed within the spirit and scope of the invention. Also, as denoted elsewhere herein, like element numbers are intended to indicate like or similar elements or features.

Figure 1:
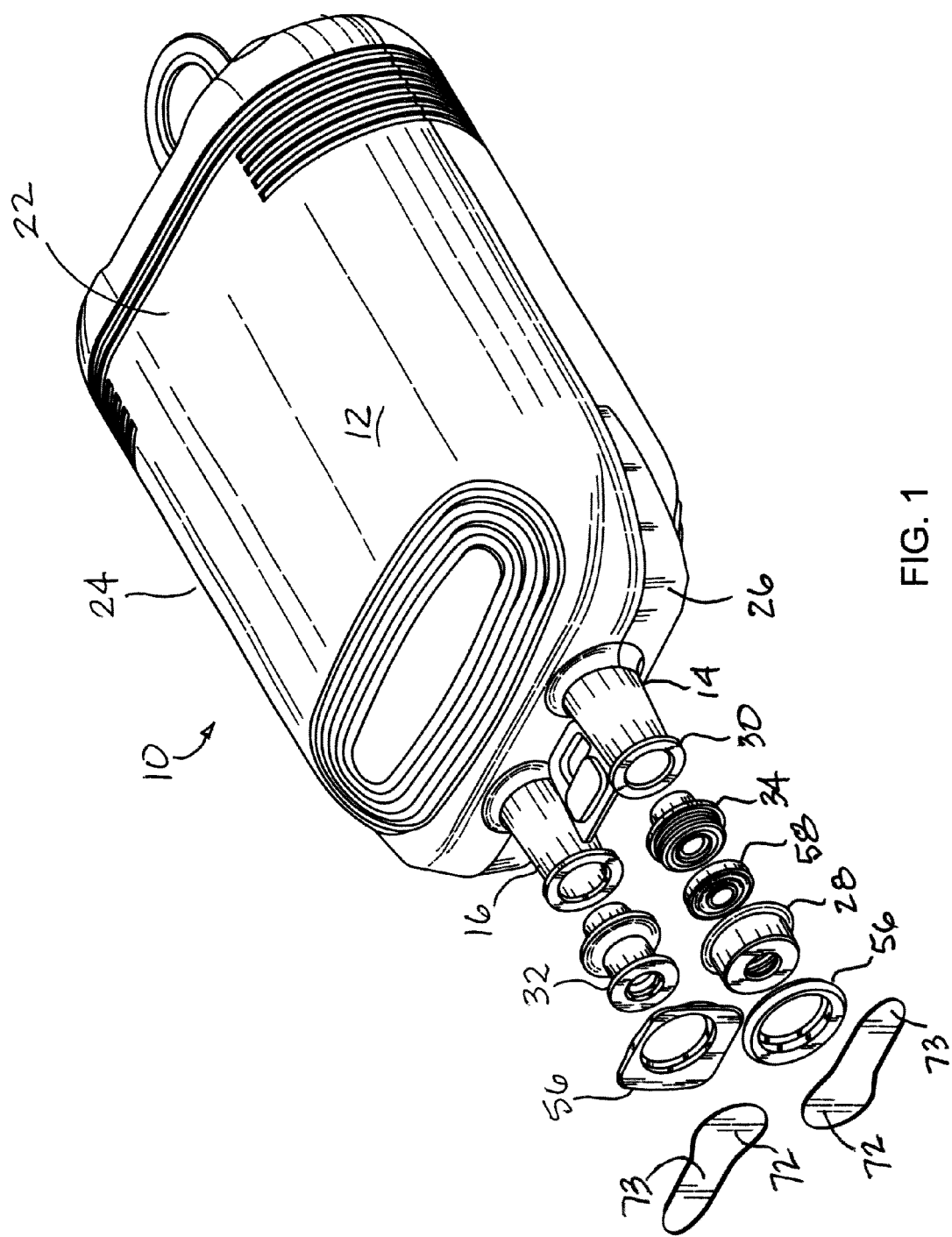
FIG. 1 is an exploded view of a flexible container having a nozzle assembly according to aspects of the present invention.

Referring now to FIG. 1, a storage container 10 is provided in accordance with aspects of the present invention. In one exemplary embodiment, the storage container 10 includes a container body 12 defining a volumetric storage space, and a first nozzle or port 14 and a second nozzle or port 16 located at a nozzle or port end 26 of the container body. For simplicity, the container body 12 may be referred to herein as a bag, holding means, or vial, which represents the container body shown and more generally any volumetric storage space. In exemplary embodiments, the vial 12 may be dimensioned to hold about 100 mL. 150 mL, or 250 mL of fluid. However, the specific amount of fluid the vial 12 is designed to hold is not limited thereto and can vary at the discretion of the designer. Additionally, the vial 12 may have various geometries, as described in more detail below.

In one exemplary embodiment, the vial 12 includes a base 22 having a hanging tab 18 with an opening 20. The hanging tab 18 may be pivotably attached to the base 22 such that the tab is foldable at least about 180 degrees around the base. The hanging tab 18 may be constructed to securely support a full storage container 10 on a hook or other hanging device. In one embodiment, the hanging tab 18 is integrally formed with the container body 12.

The vial 12 may be formed from a blow molding process, which is well known in the art. More particularly, a body section 24, the base 22, the hanging tab 18, and the discharge end 26, which in one embodiment comprises a first nozzle 14 and a second nozzle 16, are first fowled from hot parison. The formed body section 24 is then transported to a filling station to be filled with a fluid, such as an infusion liquid, fluid therapy, drug delivery parenteral nutrition, or other desired fluids, and then to a capping station. In one exemplary embodiment and as further discussed below, two upper port sections 32 and 34 are pressed into mechanical engagement with the two nozzles 14, 16 and then subsequently secured using a process known as injection attachment. This process permits filling the container with a minimum of residual air, less than about 20 cc/liter as compared to 50-100 cc/liter for typical containers. The vial 12 may be made from one of several of thermoplastic materials, for example, low density polyethylene (LDPE), high density polyethylene (HDPE), polypropylene, and nylon or combinations thereof in single layer or multi-layer wall structures. Exemplary multi-layer wall structures are disclosed in co-pending application Ser. No. 10/571,985, entitled A CONTAINER FOR INFUSION LIQUIDS, filed Mar. 14, 2006, the contents of which are expressly incorporated herein by reference. Although vent ports may be incorporated, the vial 12 is pliable and collapsible uniformly to allow fluids to drain without vent ports. To facilitate draining and collapsing, the base and side walls of the vial 12 incorporate fold lines in the manner and fashion disclosed in the '985 application.

In one exemplary embodiment, the nozzles 14, 16 may be adapted to serve as additive ports, which permit the addition of fluid and other substances into the vial 12, and/or administrative ports, which permit fluid to be drawn from the vial. The nozzles 14, 16 are generally tubular and incorporate a flange or shoulder 30 for mating with terminal ports, for example, an upper add port 34 and/or a set port 32 to adapt the nozzles to become additive ports and/or administrative ports. However, the nozzles 14, 16, as well as the body section 24, may also have different geometries, including different sizes, different cross-sectional shapes, different lengths, and different spacing between the nozzles 14, 16, without deviating from the spirit and scope of the present invention. More preferably, the nozzles are sized and dimensioned to accept ports 30, 32, which are configured to fit standard IV sets. With reference also to FIG. 2, in one exemplary embodiment the first nozzle 14 is adapted to be an additive port and the second nozzle 16 is adapted to be an administrative port.

With reference also now to FIGS. 3a and 3b, in one exemplary embodiment, the upper add port 34 incorporates a sleeve 42, a tapered flange 38 configured to mate with the flange 30 on the nozzle 14, and a notch 40 adapted to receive a lip 48 located on a cap 28 (FIG. 4), as described in more detail below. The sleeve 42 extends from the tapered flange 38 and forms an interference fit with the nozzle 14 to temporarily secure the upper add port 34 until the flanges 30, 38 are secured together, as described in more detail below. The upper add port 34 is inserted into the nozzle 14 until the tapered flange 38 on the upper add port abuts the flange 30 on the nozzle 14. A distal surface 45 of the upper add port 34 includes a pierceable membrane 44 and a groove 46. In one exemplary embodiment, the distal surface is designed to accommodate a septum 58 (FIG. 1), which has corresponding features for mating with the groove 46. A needle or other sampling means may be inserted into the nozzle 14, through the septum and the membrane, without fluid leaking through the cap. In one exemplary embodiment, the upper add port 34 is made from polypropylene, but other polymeric materials such as HDPE and LDPE may also be used.

With reference now also to FIGS. 2 and 4, the cap 28 is insertable (snaps) over the upper add port 34 so that the lip 48 on the cap mates with the notch 40 on the upper add port. A receiving section 52 (FIG. 4) for accommodating a septum 58 is formed between the distal surface 45 of the upper add port 34 and an interior surface 53 of the cap. The interior surface 53 of the cap may further include an annular septum groove 50 or multiple groove sections to provide intertwined engagement surfaces with a septum 58, as described in more detail below. The cap 28 may be made from standard prior art molding techniques, such as injection molding, using a thermoplastic material, such as a polypropylene (PP) material.

An exterior end surface 55 of the cap 28 (FIG. 4) is adapted to receive a peelable cover 72. The peelable cover 72 is configured to provide sterility and may be removably sealed to the exterior end surface 55. The peelable cover 72 may be peelable from the exterior end surface 55 prior to use, and may include a pull tab 73 to facilitate gripping. The peelable cover 72 may be heat bonded to the exterior end surface 55 and may include a polymeric material or a multi-laminate layer that includes an aluminum foil layer.

Figure 5B:
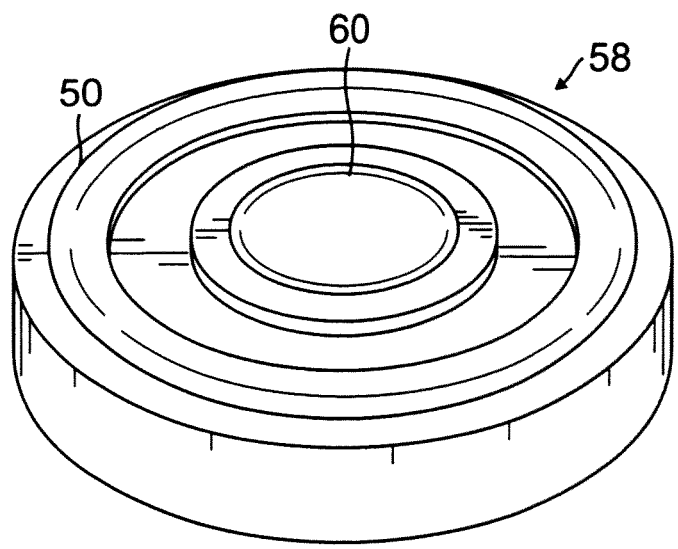

With reference now to FIG. 5, the septum 58 is configured to maintain a fluid tight seal even after a needle or other insertion means has been inserted into and subsequently withdrawn from the additive port. In one exemplary embodiment, the cap 28 is placed over the port 34 and the septum 58 is molded directly into the receiving section 52 of the cap 28 by injection molding. However, the septum 58 may also be made separately from a thermal set material and subsequently placed within the receiving section 52 of the cap 28. The cap and the septum are then snapped over the port into engagement with the port. The septum 58 may have ridges 50 on opposite surfaces 51 for mating with the septum grooves 46, 50 located in the upper add port 34 and the cap 28, respectively, to prevent lateral movement of the septum 58. In one exemplary embodiment, the septum 58 may include a convex center portion 60 to minimize touch contamination. In an alternative embodiment, a septum 59 may have a concave center portion 61 (FIG. 6) to maximize the interference surface area. The septum 58, 59 provided in accordance with aspects of the present invention may be made from a thermoplastic elastomer material, such as KRATON®, ethylene-propylene diene monomer (EPDM). SANOPRENE™, and PEBAX™ or alternatively from a thermoset elastomer, such as polyisoprene.

With reference again to FIG. 2, the flange 38 of the upper add port 34 abuts the flange 30 of the nozzle 14. In practice, a mold is first used to clamp the two flanges 30, 38 together and then molten polymeric material is injected into the cavity of the mold to form a ring for bonding the two flanges together in a process known as injection attachment. Further discussion regarding injection attachment is discussed in Ser. No. 60/912,881, filed Apr. 19, 2007, entitled STORAGE CONTAINER, the contents of which are expressly incorporated herein by reference. The resultant ring is shown as a welded flange 56 in FIG. 2. In one exemplary embodiment, molten polypropylene (PP) material is used to fuse the two flanges 30, 38 together. However, HDPE, LDPE, or other polymeric material may also be used. While the welded flange 56 is shown with stepped surfaces, any configuration, contours, or shape may be used without deviating from the spirit and scope of the present invention. In yet another alternative embodiment, a different color dye may be used for each of the two resultant rings to provide a user with color differentiations between the two ports to represent two different port types.

Figure 8A:
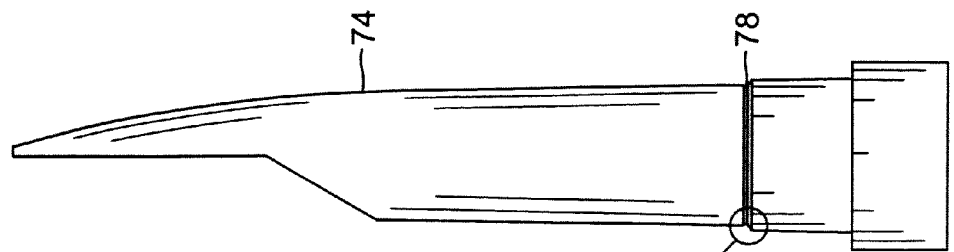
FIGS. 8a and 8b are a side view and a detail view, respectively, of a spike having a groove according to aspects of the present invention.

With reference now to FIGS. 2 and 7, a set port 32 is provided to be attached to the nozzle 16 to serve as an administrative port. The set port 32 includes a sleeve 68 insertable into the nozzle 16 and a tapered flange 66 for mating contact with the flange 30 on the nozzle 16. The set port 32 further includes an end flange 70, which provides a surface to which the peelable cover 72 (FIG. 2) is removably attached, as described above. Similar to the previously described fabrication steps, an injection attachment process may be used to create a welded flange 56 (FIG. 2) to fuse the two flanges 66, 30 of the set port 32 and the nozzle 16, respectively. The set port includes a pierceable membrane 71 through which a spike 74 (FIG. 8) may be inserted to allow fluid to be drained from the vial 12 through the administrative port.

Figure 9:
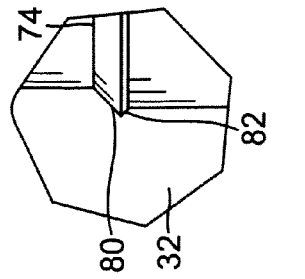
FIG. 9 is a detail view of a spike having a lip and a set port having a groove according to aspects of the present invention.
Figure 8B:
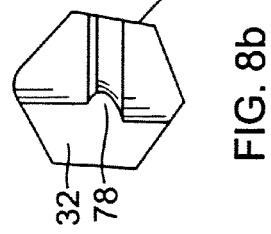

With reference now to FIGS. 7-8*b*, in one exemplary embodiment, a feedback mechanism is incorporated to provide visual, audible, and/or physical feedback when a spike 74 positively engages an administrative port. More specifically, in one exemplary embodiment, the set port 32 includes a lip or ring 76 located adjacent the pierceable membrane 71. The spike 74 is provided with a corresponding mating groove 78 adapted to mate with the lip or ring 76 on the set port 32. Accordingly, when the spike 74 is inserted into the set port 32 through the pierceable membrane 71. The groove 78 of the spike encounters the lip 76 of the set port and produces an audible click and/or a tactile vibration. Therefore, feedback is provided when the spike 74 has been sufficiently inserted into the port. In an alternate embodiment, as shown in FIG. 9, the set port 32 may incorporate a groove 80 and the spike 74 incorporates a lip or projection 82. Although a feedback system involving a combination of grooves and lips is shown and described, one of ordinary skill in the art will appreciate that other feedback systems, such as detents, ball bearings and springs, may be used as well.

Figure 10:
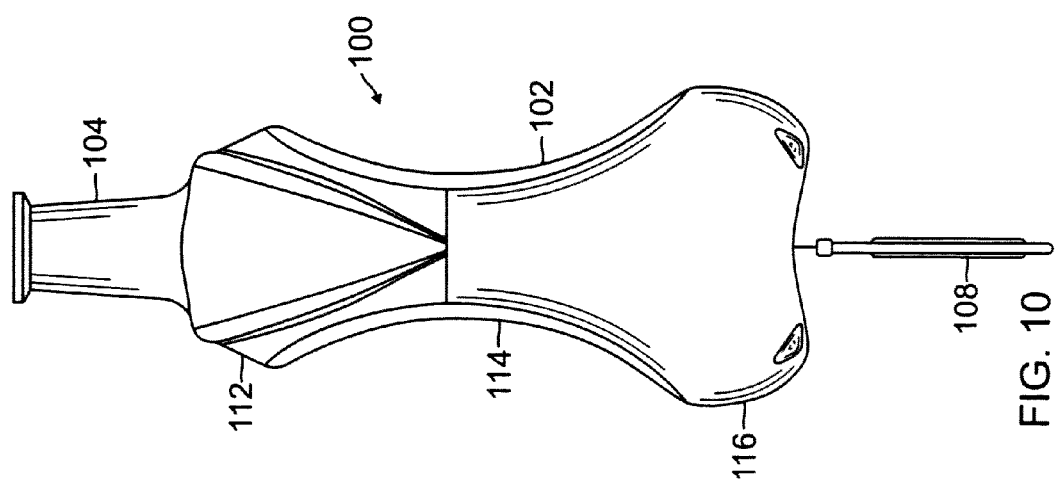
FIG. 10 is a side view of an exemplary container having an hourglass shape according to aspects of the present invention.

With reference now to FIGS. 10-12, various alternate exemplary embodiments of vials are shown. As noted above, the vials are formed using a blow molded process in which the body section, the base, the nozzles and the hanging tab are formed from hot parison, are inflated using a blowing mandrel or a needle to a certain shaped defined by a mold, and allowed to cool to take the shape of the mold.

As shown in FIGS. 10-12, the exemplary vials of the present invention have a generally hourglass longitudinal cross-section. The hourglass configuration allows a user to add a supplement or an additive into the container by expanding the concave sections of the hourglass body. In one exemplary embodiment, an additional 1%-35% of the original volumetric capacity may be added. In another embodiment, by varying the base dimension and the amount of concavity of the midsection of the hourglass configuration, 1%-100% of the original volumetric capacity may be added. Other range of expansion is also contemplated by varying the relative dimensions of the hourglass configuration. To facilitate expansion and subsequent collapse of the container, the container wall thickness is preferably in the range of about 0.008-0.016 inch. As with the container disclosed with reference to FIG. 1, fold lines may be incorporated in the base and side walls to facilitate collapsing, as are disclosed in co-pending application Ser. No. 10/571.985, which has previously been incorporated by reference.

With specific reference now to FIG. 10, an hourglass-shaped container 100 is shown having a vial or body section 102, a pair of nozzles 104 extending from the vial, and a hanging tab 106 integral with a base 108, which has a base having four standing corners for standing the container upright on its base. Thus, the container may be hung from its tab 106 or stand upright on its base 108. For purposes of illustration, the vial 102 may be divided into three sections: An upper body or head section 112 adjacent the nozzle 104, a middle body or midsection 114, and a lower body or tail section 116 adjacent the base 108. As shown in FIG. 10 and as a non-limiting example, the midsection 114 has a width dimension smaller than the width dimension of the head section 112 and the tail section 116. In one exemplary embodiment, the length of the body section excluding the nozzles and the hanging tab is about 2.95 inches and a maximum width measured orthogonal to the hourglass cross-section of about 3.49 inches. A maximum width dimension of the vial 102 along the hourglass cross-section is about 1.5 inches measured at the tail section 116. From the widest width dimension along the hourglass configuration, the midsection 114 tapers to a narrowest point of about 0.68 inch before widening again to a width of about 1.25 inches. Additionally and as previously discussed when the vial 102 is filled with fluid, the additional surface area of the concave walls of the midsection 114 are expandable to form a generally flat constant cross-section or even a convex shape, therefore providing an additional volumetric capacity greater than a comparable container with walls that are only expandable to be substantially parallel to each other. In one specific example, an empty volume of the container 100 is about 100 mL without expanding the concave walls and expandable to an expanded volume of about 190 mL when the concave walls of the hourglass configuration are expanded. In operation, as fluid drains from the vial 102. The walls of the emptying container will return to their empty hourglass shape and even collapses to the point where the container's interior wall surfaces touch one another to expel substantially all of the fluid contained in the vial without the need for an external pressure source.

With reference now to FIGS. 11 and 12, the hourglass shape may also be more defined or less defined. In one exemplary embodiment of a container 120 (FIG. 11), a length of the vial 122 is about 5.65 inches and a maximum width of the vial is about 3.69 inches, measured along the plane orthogonal to the hourglass configuration. A maximum thickness or width dimension along the hourglass cross-section of the vial 122 is about 1.8 inches, which tapers to a minimum thickness of about 1.2 inches before tapering back to a thickness of about 1.5 inches. The empty volume of the container 120 is about 250 mL and the full volume of the container is about 492 mL when filled to expand the concave walls. However, other volumetric capacities are contemplated by varying the various dimensions of the container.

With reference now to FIG. 12, in another exemplary embodiment of a container 130, a length of the vial 132 is about 3.58 inches and a maximum width of the vial is about 3.49 inches. A maximum thickness or dimension along the hourglass configuration of the vial 132 is about 1.5 inches, which tapers to a minimum thickness of about 0.88 inches near the concave section before tapering back to a thickness of about 1.1 inches. The empty volume of the container 120 is about 70 mL and the full volume of the container is about 140 mL, when filled to expand the concave walls. However, other volumetric capacities are contemplated by varying the various dimensions of the container.

With reference now to FIGS. 13*a*-13*d*, a container 140 incorporating a body 142 defining a cavity for containing fluid, similar to the vial 12 described above, and a base 144 on which the container 140 is adapted to stand is shown. A hanging tab 158 may be integrally attached to the base 144, the hanging tab 158 including an opening 160 to allow the container 140 to be hung from a hook or other hanging devices. The container 140 further includes a port 146 having a flange 148 at a distal end. The flange 148 is mate-able with a flange of a terminal port, such as the upper add port 34 or set port 32, as described above. In a preferred embodiment, the container incorporates two ports 146, an additive port and an administration port.

In one exemplary embodiment, the body 142 includes an integral midsection 154 and a tapered tail section 156. The base 144 is integral with the tapered tail section 156 and the base can be folded, along a plurality of creases, against the tapered tail section to act as a stand for the container 140. In one exemplary embodiment, an integral base crease 145 extends laterally across the body 142 to define a boundary between the tapered tail section 156 and the base 144. The base 144 is further creased such that the base can be transferred between an expanded position (FIG. 13b), which allows the container to be hung from the hanging tab 158, and a collapsed position (FIG. 13c), which allows the container to stand upright on the base. More specifically, the base 144 includes a plurality of first creases 152, a plurality of second creases 153, and at least one third crease 166, which when folded form two extensions 155 (FIG. 13d) having upper and lower exposed surfaces 182, 184. The extensions 155 may be foldable inward or outward relative to the perimeter of the body 142 of the container and the entire base transforms to a generally flat base for standing upright on its end. A pair of first creases 152 on each side of the base 144 extends towards a centerline 162 of the container 140 at an angle from the tapered tail section 156 and outward towards a base corner 164 such that the pair of first creases meet at the base corner. In one exemplary embodiment, the first creases 152 extend at about a 37 degree angle from the horizontal in the expanded position. The second crease 153, around which the extensions 155 are pivotable, extends along a border between the tapered tail section 156 and the base 144 between each pair of first creases 152. The third crease 166 extends laterally along an end 168 of the container, substantially bisecting a thickness of the container.

Figure 13A:
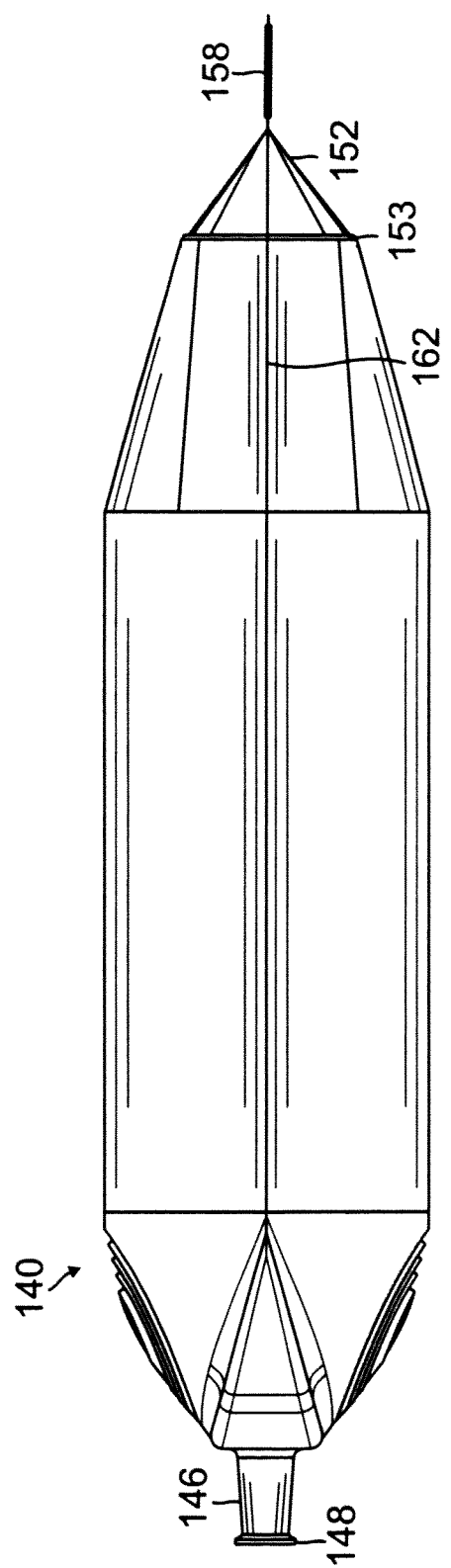
FIGS. 13a and 13b are a side view and a top view of a flexible container having a foldable base according to aspects of the present invention.
Figure 13B:
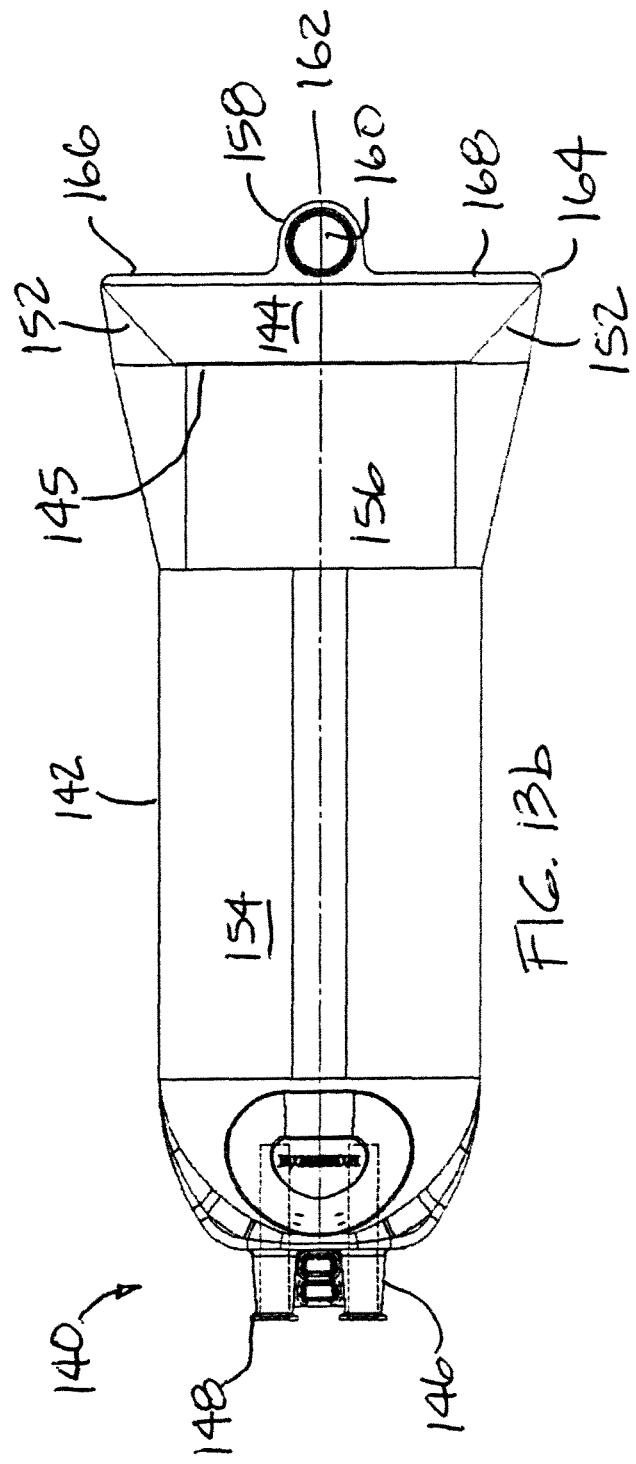
Figure 13D:
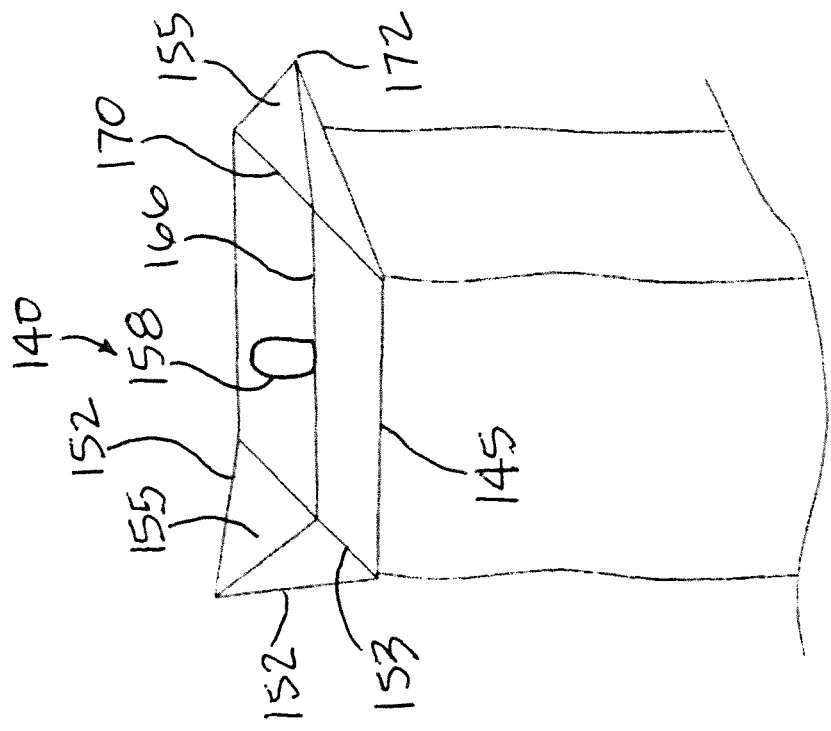
FIG. 13d is a schematic perspective view of a foldable base in a transition position according to aspects of the present invention.
Figure 13C:
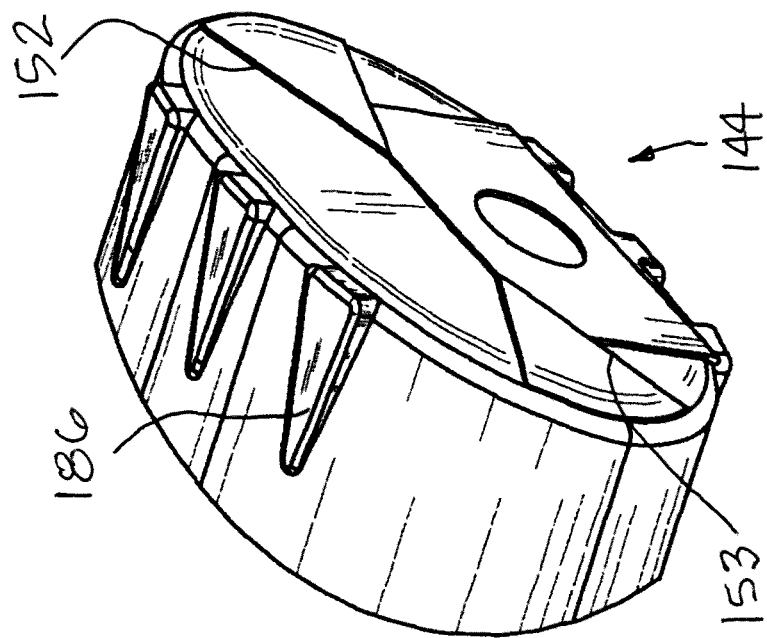
FIG. 13c is a perspective detail view of a foldable base in a collapsed position according to aspects of the present invention.

To place the base 144 into a collapsed position from the expanded position, a force is applied to the base in the direction of the port 146, flattening the base and causing the extensions 155 to be defined by the creases 152, 153, 166. Accordingly. In a transition position between the expanded position and the collapsed or folded position, as shown in FIG. 13d, the extensions 155 protrude from the tapered tail section 156, the extensions including a base 170 of a first dimension and tapering towards a tip 172 of a second dimension. In one exemplary embodiment, the extensions 155 are substantially triangular. The extensions 155 can then be folded along the second crease 153 towards the hanging tab 158 to be tucked underneath the now flat base 144, as shown in FIG. 13c. In this collapsed state, the extensions 155 serve as a support in connection with the rest of the base 144 on which the container 140 can stand upright.

In one exemplary embodiment, the container 140 is manufactured by the blow-fill-seal process described above. The mold is configured with ridges so that when hot parison is blown against the mold, the creases 145, 152, 153, 166 may be formed integral with the body 142 as the container 140 is formed against the mold. Alternatively, some of the creases may be created by the mold and some of the creases may be created merely as a result of folding the extensions 155 between the expanded state and the collapsed state.

Figure 14A:
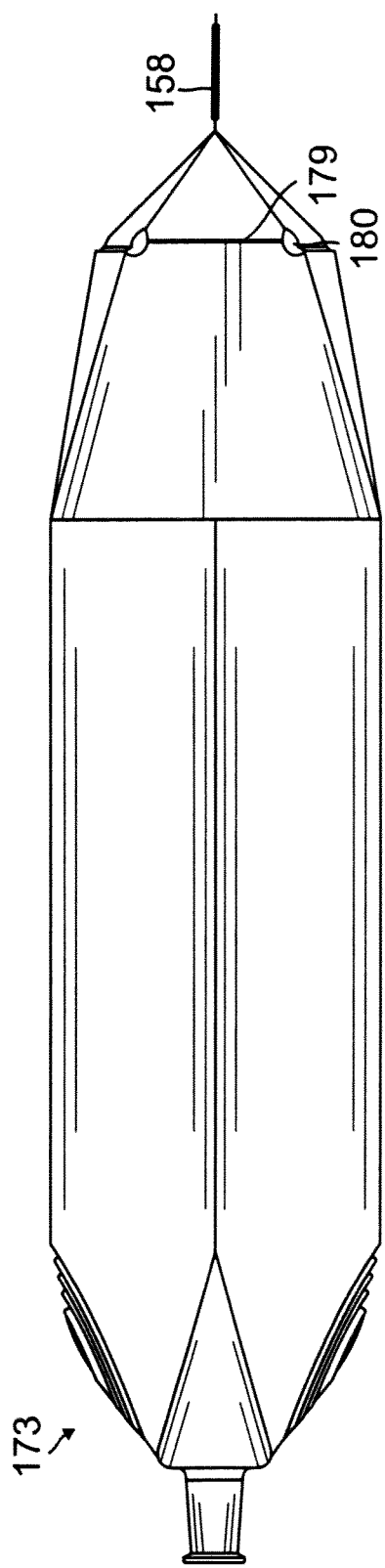
Figure 14C:
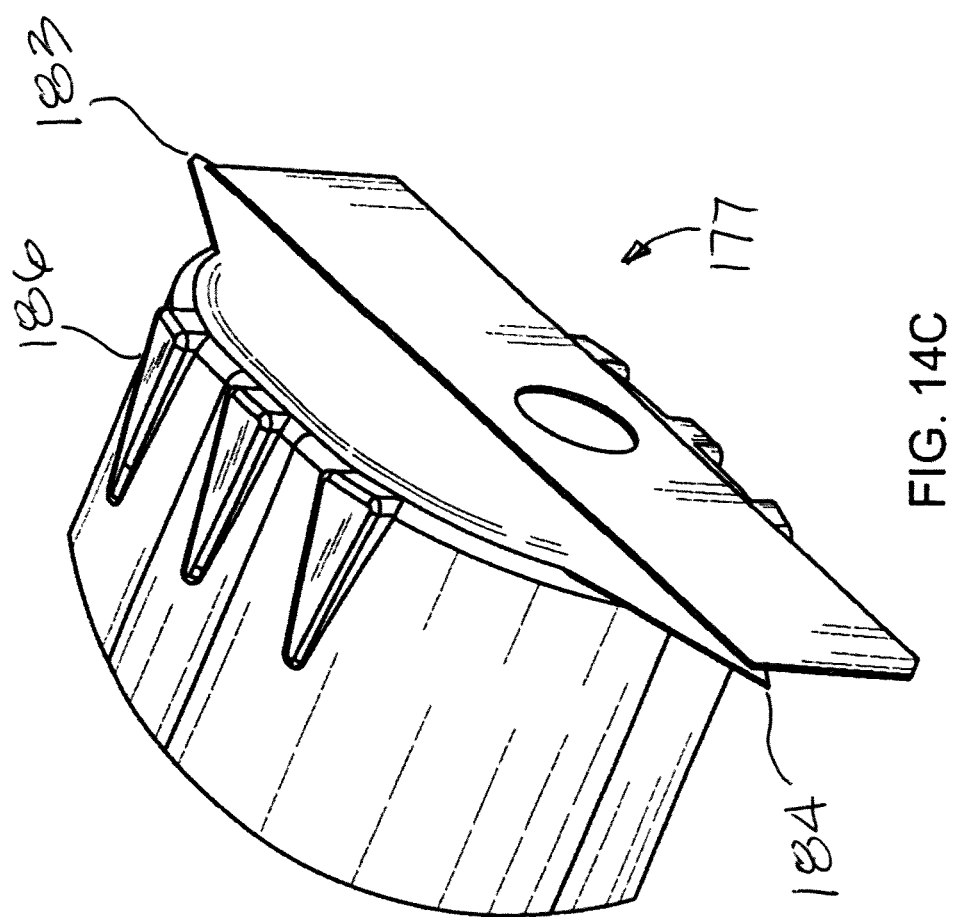
FIG. 14c is a perspective detail view of another foldable base in a collapsed position according to aspects of the present invention.

With reference now to FIGS. 14a-14c, in another exemplary embodiment, a container 173 is shown incorporating a body 174 having a midsection 175 and a tapered tail section 176 integral with a base 177 defined by a base crease 182. Similar to previously described embodiments, the base 177 includes a plurality of first creases 178, a plurality of second creases 179, and a third crease 181, which when fold define two extensions 183. More specifically, a pair of first creases 178 on each side of the base 177 extends toward a centerline 162 of the body 174 at an angle from the tapered tail section 176 and outward toward a base corner 184 such that the pair of first creases meet at the base corner. The second crease 179, around which the extensions 183 are pivotable, extends along a border between the tapered tail section 176. Additionally, the body 174 includes a plurality of stress relief points or craters 180, each crater located between the base crease 182 and a second crease 179. The craters 180 act as stress relief points thus allowing the extensions 183 to fold outward, i.e., away from the centerline 162, as opposed to toward the centerline, when the base 177 is transformed from an expanded position to a folded position. Accordingly, the outwardly folded extensions 183 provide additional surface area and support for the base 177 on which the container 173 can stand upright.

In another exemplary embodiment, as shown in FIGS. 13c and 14c, the tapered tail sections 156, 176 may optionally include ribs 186 which add structural integrity to the bases 144, 177, respectively, and provide additional support to allow the containers 142, 173 to stand thereon. In one exemplary embodiment, the ribs 186 are formed by the same mold during the blow-fill-seal process and are integral with the containers 142, 173. Additionally, although three ribs are shown having a substantially triangular shape, one of skill in the art will appreciate that many different geometries and numbers of ribs may be incorporated.

Figure 15:
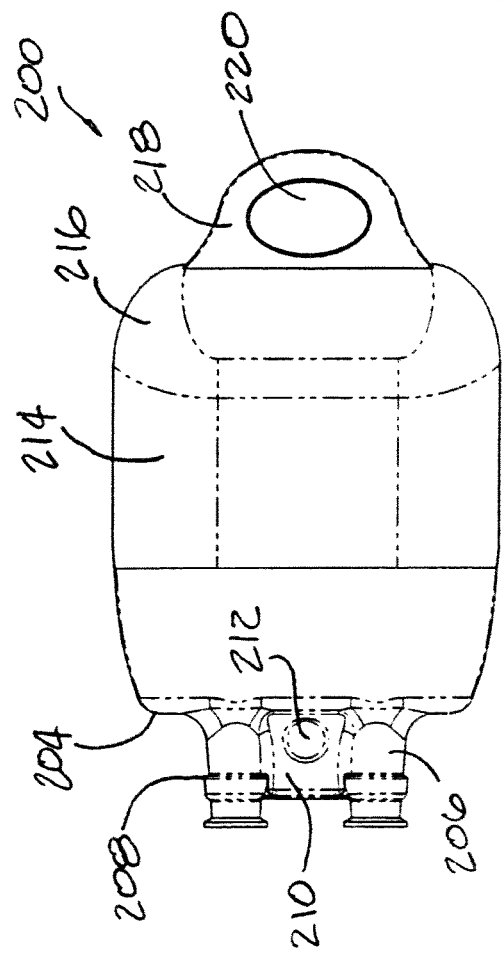
FIG. 15 is a schematic front view of a container provided in accordance with aspects of the present invention.
Figure 16:
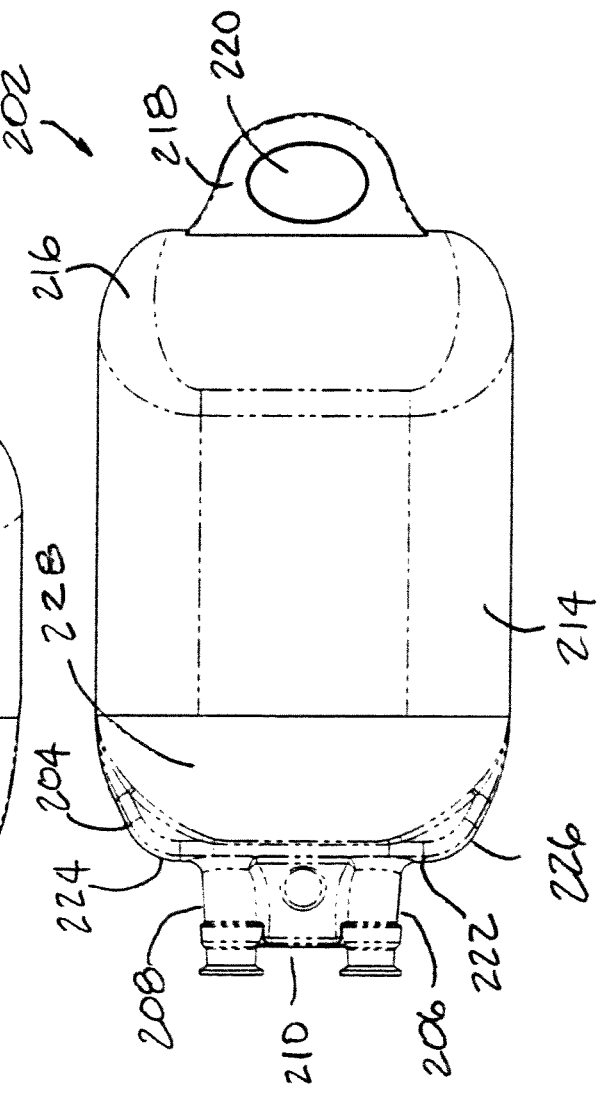
FIG. 16 is a schematic front view of an alternative container provided in accordance with aspects of the present invention.

With reference now to FIGS. 15 and 16, two schematic front views of two containers 200, 202 provided in accordance with aspects of the present invention are shown, which preferably are blow-molded containers. For purposes of the following discussion, the container of FIG. 15 is a 50 mL container while the container of FIG. 16 is a 250 mL container with different volumetric sizes contemplated. The two containers each incorporates a nozzle end 204 having a first nozzle 206, a second nozzle 208 and a web 210 interconnecting the two. The web 210 optionally includes a passage or opening 212 for aesthetic appeal for use in manufacturing, such as for hanging or registering, or both. In one exemplary embodiment, the two nozzles 206, 208 of each container have a pre-configured spacing measured between respective center axes of each nozzle. More preferably, the spacing between each pair of nozzles of each container is generally the same even though their volumetric storage capacities differ. Among other reasons, making different sized containers with a nozzle end having generally the same spacing between two container nozzles allows for more efficient automation. As discussed above, the two nozzles 206, 208 are configured to attach with upper port sections or terminal ports, such as with an additive port and a set port.

Also shown in FIGS. 15 and 16 are container body sections 214 and base sections 216. The body sections 214 of the different sized containers generally have the same width. The different volumetric capacities are therefore due to differences in lengths. Alternatively, the containers can be made to vary in widths to change their storage capacities. In one embodiment, the base sections 216 of each container incorporate an integrally formed hanging tab 218 having an opening 220. In one embodiment, the hanging tab 218 is formed by compressing two mold-halves against hot parison during a blow-fill-seal operation. The tab preferably has a thickness in the order of $3/64^{th}$ inch to about $1/8^{th}$ inch so that it resists canting over. This allows the tab to easily be hung to a hook by a clinician or nurse without having to separately hold the tab upright. Said differently, because the tab is formed from a thicker material, it will resist bending at the interface with the edge of the container to make hanging the container by the tab relatively easier and without requiring a second hand to align the tab vertical for hanging on a hook.

With reference again to FIG. 16, the nozzle end 204 is formed on a container shoulder 222, which generally has a greater wall thickness than the wall thickness of the body section 214. The shoulder 222 can be viewed as having a generally planar section 224 and a skirt section 226, at the intersection between the generally planar section and the body section. Following molding and during the filling step, the shoulder 222 will generally resist expansion due to its greater wall thickness, or expand less, than the corresponding body and base sections. As further discussed below with reference to FIGS. 19-22, the nozzle end of the container 214 defines a fixed end 228 not subject to post mold manipulation. More preferably, the nozzle end 204 and the shoulder 222 define a fixed end 228.

FIG. 17 is a perspective view of the container 200 of FIG. 15, or alternatively of the container 202 of FIG. 16. FIG. 18 is a side view of the container of FIG. 17. For purposes of the following discussions, reference is made only to container 202 of FIG. 16 although the same applies to container 200 of FIG. 15. As previously discussed, the container is preferably made from a blow-fill-seal operation using thermoplastic material, such as low density polyethylene (LDPE), high density polyethylene (HDPE), and polypropylene (PP) material with PP being more preferred and with LDPE being most preferred.

It has been found that as containers made by blow molding vary in size, their wall thicknesses are difficult to control or regulate. This is especially true with smaller containers. Consequently, during use, containers may not collapse the same way even among containers of similar sizes. Accordingly, an aspect of the present invention is a container and a method for making the container having pre-conditioned collapsed state. Such pre-conditioned collapsed state facilitates the return of the container to that state when it is drained of its contents. With reference now to FIG. 19, a perspective view of the container 202 of FIG. 17 is shown, which is clamped between two clamps 230. In a particular embodiment, the clamps 230 are generally U-shaped and sized to only clamp along the perimeter of the container 200, 202, below, the fixed end 228 and above the tab 218. Alternatively but less preferred, the clamps 230 may be solid and configured to clamp the entire body section 214 including the front and rear container wall surfaces but excluding the fixed end 228. The clamps 230 are applied to the container 202 immediately following the molding process but before the container is filled. In an embodiment while the container has been expanded against the molds in the molding machine, but minimally cooled in the to-be-set areas, the container is removed and transferred to a pressing station (not shown). The to-be-set areas of the container are preferably warmer than the plastic material softening point. More preferably, with typical polypropylene co-polymers, the container to-be-formed areas are is at about 270° F. such as greater than 250° F. but less than about 290° F. These targeted to-be-set areas of the container may be preferentially maintained at a higher temperature than the other container areas by running hotter cooling water through the mold zones corresponding to these to-be-set container areas. At the pressing station, the container 202 is held by its nozzle end 204, its tab 218 or both and the two clamps are pressed together to compress the body section of the container. The clamps are applied with just sufficient pressure to squeeze the plurality of edges of the container (i.e., the 'to-be-formed' areas) together but not overly applied so as to permanently deform the plurality of edges. The edges are held pressed together while they cool under said compression, thereby re-forming into a new permanently set compressed geometry. A cool gas stream, such as ambient air, may blanket the container while it is being compressed to quench the container. Alternatively, the container may be allowed to cool to ambient temperature and then re-heated by a heat source, such as in an oven, by a radiant heat source, by direct contact with a heated plate, or by passing heated draft air or steam over and/or into the container.

FIG. 20 is a side view of the assembly of FIG. 19. As clearly shown, the clamps 230 are preferably spaced from one another by a small gap to avoid structural damage to the container. In an embodiment, spacers are provided, such as dowels, pins or shoulders, to ensure a minimal gap between the two clamps. In one exemplary embodiment, a gap of about 3/64 to 1/16' an inch is provided between two planar surfaces of the two clamps. The clamps may be separated after a few seconds, such as after about 2 seconds to about 10 seconds, depending on the temperature of the container when it was clamped and how effective the cooling process is (efficacy of the cool gas stream optionally applied). In an embodiment, the interior surface of the end section 232 of each clamp may be tapered to provide a smooth transaction with the arcuate fixed end 228 of the container. Alternatively, the clamps may be allowed to close fully without spacers, limited solely by a limited and controlled applied pressure.

FIG. 21 is a front view of the assembly of FIG. 19. The clamps 230 used to compress the container may be made from a rigid metal material, alloy, or hard plastic, such as PEEK, UHMWPE, polysulfone, PTFE, etc FIG. 22 is a perspective view of the container 202 of FIG. 19 after the clamps 230 have been removed, i.e., after post mechanical treatment. By treating the container following the blow molding process, the container is conditioned to collapse or return to its preferred flattened state, as shown, even after it has been inflated and subsequently drained, such as by filling the container with a medicinal solution and dispensing the solution. Thus, in accordance with aspects of the present invention, there is provided a container for storing fluid, said container comprising a nozzle section comprising at least one nozzle, a body section, and a base section. The nozzle section comprises a shoulder, which has a width and a depth, orientated perpendicularly to one another. The depth of the shoulder has a larger dimension then the depth of the container body section measured between the front container wall and the rear container wall, before the container is filled. In a further aspect of the invention, the depth of the container body section measured between the front container wall and the rear container wall is about the same or greater depth as the shoulder in a first configuration, and wherein the depth is less than the depth of the shoulder in a second configuration. In a particular embodiment, the reduced depth of the body section from a first configuration to a second configuration is caused by mechanical means, which in one embodiment includes two clamps with opposing surfaces for squeezing the body section therebetween. In another embodiment, the post-blow-molding treatment is accomplished by a vacuum source, as discussed further below.

Figure 23:
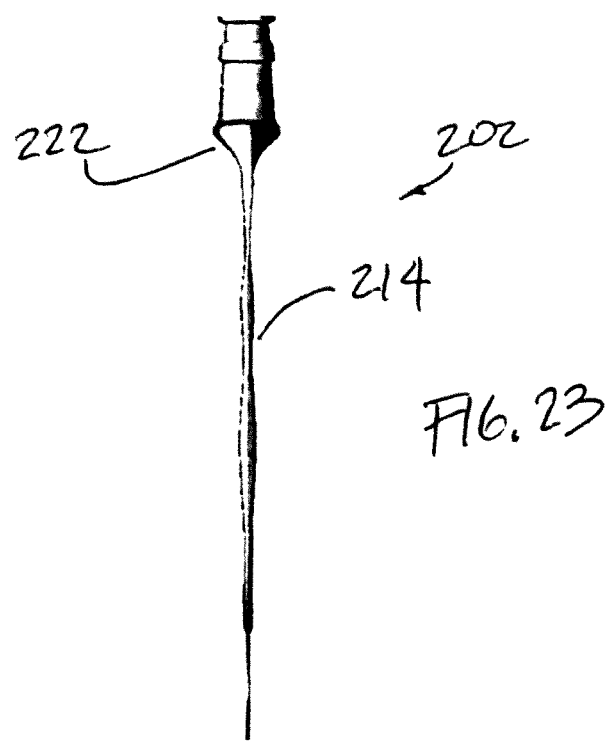
FIG. 23 is a side view of the container of FIG. 22.

FIG. 23 is a side view of container of FIG. 22, showing the depth of the shoulder section 222 and the body section 214. As is clearly shown the depth of the shoulder section is greater than the depth of the body section due to the post-blow-molding treatment.

Figure 24:
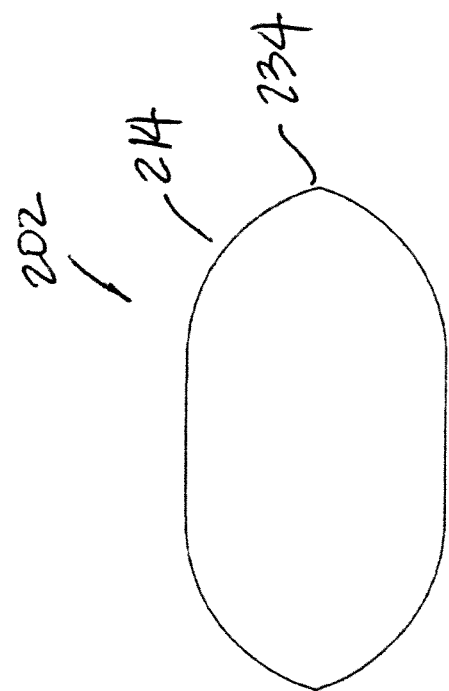
FIG. 24 is a schematic depiction of a cross-sectional end view of a container of the present invention showing a generally elliptical configuration following blow molding.

FIG. 24 is a schematic cross-sectional end view of a body section 214 of the container 202 of FIG. 16. The generally elliptical shape body section 214 of the container is the shape following the molding step, which represents the shape of the mold inserts of the blow molding machine. Although not shown, in one embodiment, the centerline edge or parting line 234 of the container is formed with a thickened or enlarged seam. This may be implemented by creating a small inset on the two mold-halves so that additional parison may flow into the inset space during the blow molding process. The thickened centerline edge 234 of the container further facilitates the flattening process, as discussed above.

Figure 25:
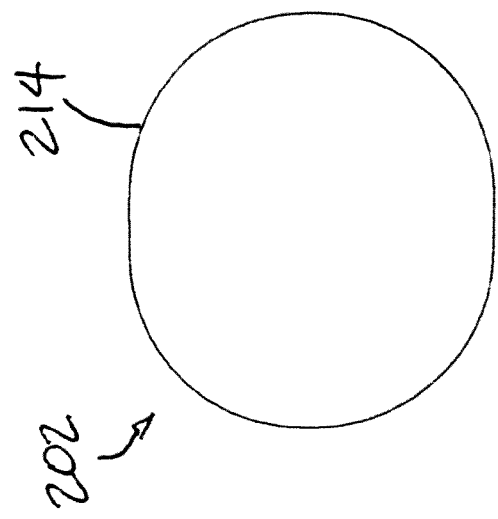
FIG. 25 is a schematic depiction of a cross-sectional end view of the container of FIG. 24 being expanded, such as by over-filling the container of FIG. 24 so that its body section expands to store a greater volume than the original volume.

As discussed above with reference to FIGS. 17-23, the container is subsequently processed in a pressing machine to flatten the body section. However, as the body section is pliable, the flattened contained may be filled with a fluid to return to its initially formed state (FIG. 24) or even over-filled and expanded. FIG. 25 is a schematic cross-section end view of the body section 214 of a container, which represents a condition in which the container is over-filled with a fluid and is transformed to a more circular shape. Thus, for a fixed container body surface, the transformation from a generally elliptical shape to a more generally circular shape increases the volumetric capacity of the container to thereby permit greater storage capacity. Accordingly, in an aspect of the present invention, there is provided a container comprising a first configuration comprising a generally elliptical body section, a second configuration wherein the body section is flattened so that the body section has a width that is less than the width of a shoulder section, and a third configuration in which the depth of the body section is greater than the depth at the first configuration and second configuration. In a still yet further aspect of the present invention, there is provided a method for post-blow-molding manipulation of a container comprising obtaining a blow molded container having a first temperature greater than ambient temperature, applying two clamping surfaces so that a body section of the container is compressed by the two clamping surfaces, and cooling the container to a second temperature, which is less than the first temperature. In specific aspects of the present invention, the two clamping surfaces are each generally U-shaped and the container is clamped along its edges by the U-shaped clamps.

Referring again to FIG. 22 in addition to FIG. 17, in one embodiment the blow molded container 202 (FIG. 17) is post blow mold treated by coupling a vacuum source to one or both nozzles 206, 208 immediately following the blow-molding process and while the container is still warm, as previously discussed. In one specific embodiment, the injection pins used in the blow-molding process are coupled to a vacuum source. Thus, following the pressurization process to blow the hot parison against the molds to form the container, the majority of the container surface areas are allowed to cool in the mold, but the critical to-be-formed areas are preferentially subject to minimal cooling, via selectively warmed cooling zones in the mold areas. Immediately after the mold opens or alternatively the vacuum may be applied slightly before mold opening to speed the process, a vacuum is then pulled to evacuate air from the interior cavity of the container to flatten the container. The flattened container resembles the container shown in FIG. 22. During the vacuum process, additional draft air may be applied to quench or rapidly cool and 'set' the preferentially hotter areas of the container. Once cooled, the container has a flattened shape in which the body section is narrower than when originally formed by a blow-molding process. Thus, an alternative method is herein provided to flatten a blow-molded container using a pneumatic source. Said container having conditioned container edges to facilitate dispensing of fluid stored inside the container.

Figure 26:
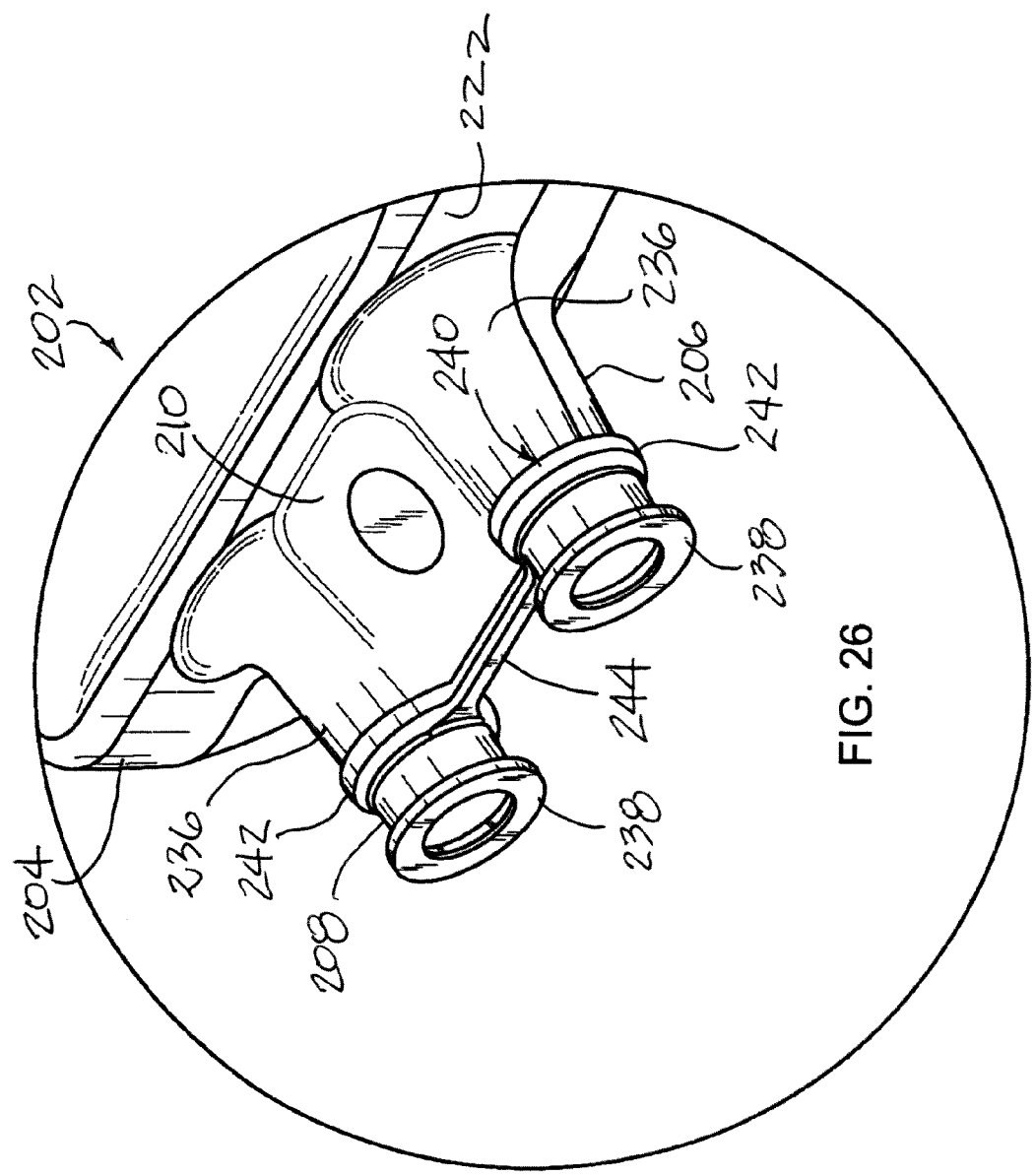
FIG. 26 is an enlarged perspective view of a nozzle section of a container of the present invention that includes a stepped feature.

FIG. 26 is an enlarged perspective view of the nozzle section 204 of the container 202 of FIG. 16, which also shows the shoulder 222, the two nozzles 206, 208, and the web 210 interconnecting the two. The two nozzles 206, 208 are each formed with generally cylindrical tubular sections 236 configured to receive an IV spike for administration or for receiving a medical implement for adding fluids or other supplements. The tubular sections 236 each comprising a nominal outside diameter and a nominal inside diameter with certain draft angles formed from the molding process. A flange 238 is located at an end of each nozzle for mating assembly with a corresponding flange of a set port or of an additive port (See, e.g., FIG. 1). The mated flanges may be attached to one another using adhesive bonding. However, the attachment between the flanges is preferably by way of attachment welding, as previously discussed.

In one embodiment, a stepped structure 240 is located just distal of the flanges 238. In a preferred embodiment, the stepped structure 240 comprises two ring-shaped steps 242. The stepped structure 240 may be formed by providing insets at corresponding nozzle sections of the molds to create flowable space for excess hot parison to flow into during insertion of the blow pins during the blow molding process. It is desirable that the necks of the ports have high quality fully filled conforming geometry, referred to as a 'calibrated' finish. To achieve this sufficient hot molten material from the parison must be pressed by the blow pin(s) and cutting rings into the mold cavity during blow pin insertion. Insufficient material insertion will result in voids, while excessive material will be pushed down into the throat of the ports by the blow pin tips and potentially create irregular obstructions to the port-container inner generally tubular geometry. By providing a stepped ring, incremental volumetric space is provided to accommodate variations in the pushed-in excess material. In a most preferred embodiment, the inside diameter of the port over the first section, in practice approximately the first 5 mm, have a 'calibrated' or 'sized' finish to facilitate an interference fit with the closing part applied post filling to form a gas tight pre-seal prior to injection attachment. Therefore, to achieve appropriate calibration, at least a slight excess of material should be available to fill the top port section and prevent voids. The stepped ring accommodates the needed excess material and provides a space to accommodate the normal variability of quantity of needed excess material. In one embodiment, the formed stepped structure 240 may also be utilized as a handling feature during container fabrication by providing a ledge to be gripped by a robot arm or other automated devices. Accordingly, in an aspect of the present invention, there is provided a container comprising two nozzles spaced apart from one another having an optional web disposed therebetween and connected thereto. In one specific embodiment, a bridge having an enlarged rib is located at the proximal end edge of the web and connects to two spaced apart ring-shaped steps. The ring-shaped steps each circumscribes a nozzle and increases the outside diameter of the nozzle over a nominal outside diameter. In a further aspect of the present invention, a method is provided comprising obtaining the container having a stepped structure and grabbing the stepped structure with an automation device for completing the container. An exemplary automation device includes a robotic arm or a pick-n-place arm.

Figure 27:
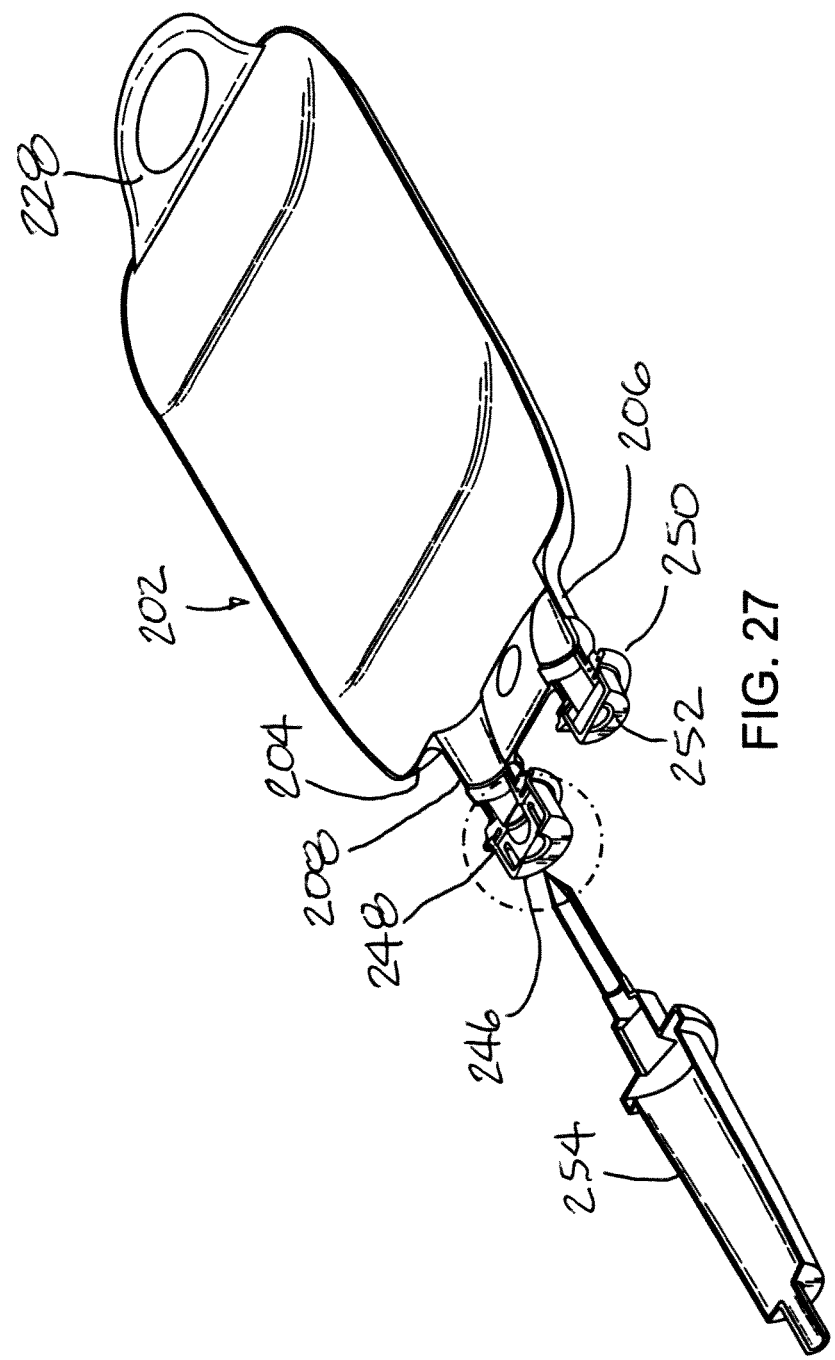
FIG. 27 is a cross-sectional perspective view of a container provided in accordance with aspects of the present invention having a set port and an additive port attached to the two container nozzles.

FIG. 27 is a cross-sectional perspective view of the container 202 of FIG. 17 taken along the parting line of the container between the front side and the back side. Thus. FIG. 27 shows half of the nozzle section 204, half of the body section 214, and half of the width or thickness of the tab section 218. Additionally, a set port 246 comprising a stopper 248 is attached to the second nozzle 208 and an additive port 250 comprising a septum 252 is attached to the first nozzle 206. As discussed above with reference to the containers of FIGS. 1-9, the nozzle having the set port is configured to receive an IV spike 254 while the nozzle having the additive port is configured to receive a needle and the like for adding supplements or medicine to the contents of the container. Additionally, the set port 246 may incorporate a groove or a bump as discussed above with reference to FIGS. 8b and 9 for use with a spike as discussed with reference to FIG. 8a. Such combination has the benefit of providing tactile feedback to the user when the spike is appropriately inserted into the set port.

Figure 29:
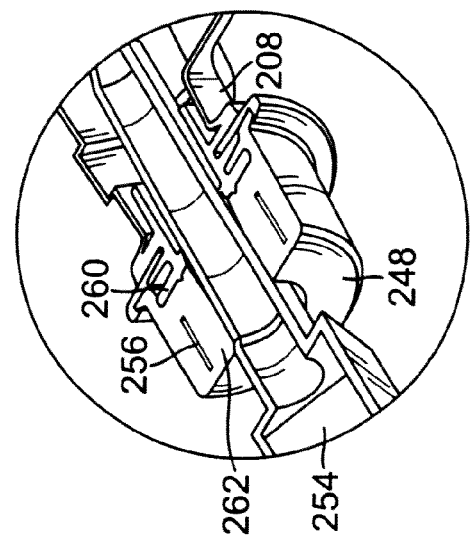
FIG. 29 is a blow up view of the set port of FIG. 27 having an IV spike inserted through the stopper.
Figure 28:
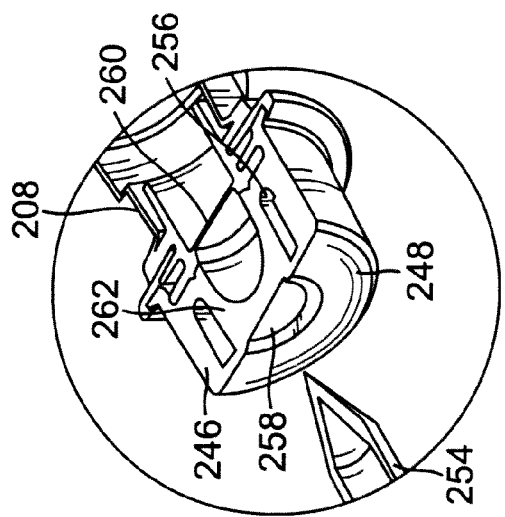
FIG. 28 is a blow up view of the set port of FIG. 27.

With reference now to FIG. 28 in addition to FIG. 27, an enlarged view of the set port 246, stopper 248, and second nozzle 208 is shown. In practice, the set port 246 includes a thermoplastic outer housing for accommodating the stopper 248 as shown, for example shown in FIG. 2. Also shown are pockets or expansion gaps 256, which in practice may be an annular space defined by a central section 262 and an outer periphery of the stopper. The stopper 248 has a punctureable top surface 258 while the set port has a punctureable membrane 260, similar to the membrane discussed above with reference to other figures. As is well known in the art, when the IV spike 254 punctures the top surface 258 and the membrane layer 260, fluid is established between the contents of the container and the patient connected to the far end of the IV line, which is shown in FIG. 29. Also shown in FIG. 29 is the central section 262 expanding radially outwardly to accommodate the spike 254. Consequently the annular space 256 is reduced by the expanded central section 262 when the spike is inserted. In certain instances, the annular space 256 may disappear altogether if the ratio of the expanding central section 262 is greater than the available expanded annular space. The lack of space for expansion is even greater as the size of the stopper decreases, such as when used in connection with smaller sized containers.

An additional issue with stoppers as they decrease in size is the ability to adequately seal when the spike 254 is removed and the high degree of force necessary to insert the spike. One contributing factor to these problems is the lack of material as stopper sizes decrease. The resiliency of a stopper and its ability to rebound depend not only on the type of rubber or elastomer used, but also on the thickness of the material at the point of expansion or compression. As such, smaller sized stoppers are difficult to penetrate due to insufficient stopper material, and therefore to adequately expand, and are less likely to seal.

Figure 30:
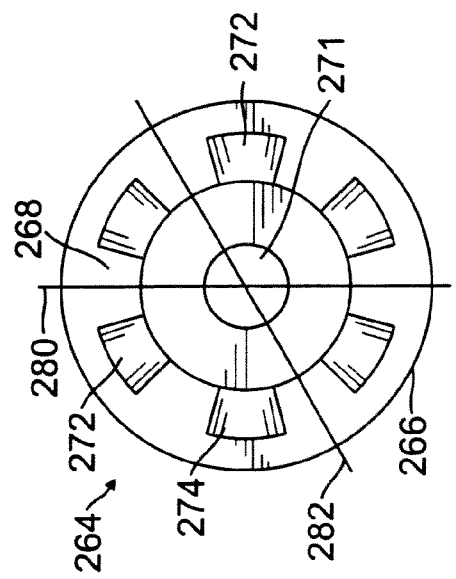
FIG. 30 is a top view of a stopper provided in accordance with aspects of the present invention.

With reference now to FIG. 30, a top view of an alternative stopper provided in accordance with aspects of the present invention is shown, which is generally designated 264. In one embodiment, the stopper is made from a thermoplastic elastomer (TPE) material. In a specific embodiment, the TPE is KRATON®, ethylene-propylene diene monomer (EPDM), SANOPRENE™, or PEBAX™, or alternatively from a thermoset elastomer, such as polyisoprene. Although shown with different shading for purposes of discussion, the preferred stopper 264 has a single uniform shading.

Figure 31:
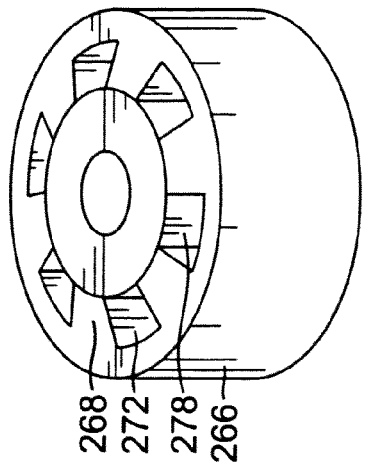
FIG. 31 is a perspective view of the stopper of FIG. 30.

In one embodiment, the stopper 265 comprises a cylindrical outer wall 266 and a plurality of ribs 268 in contact with and preferably singularly formed with the outer wall 266. In one embodiment, six space-apart ribs are incorporated. However, two to five or more than six ribs may be incorporated without deviating from the spirit and scope of the present invention. A central penetrable section 270 is disposed at the center of the stopper and in contact with the plurality of ribs 268, which in a preferred embodiment are singularly formed with the plurality of ribs. The central penetrable section 270 has a top wall 271 but is otherwise hollow and has a cavity 276 (FIG. 32, which is a reversed view of FIG. 30) defined by the central wall 278. A plurality of expansion gaps 272 are disposed in between the plurality of ribs 268 for accommodating the central section 270, as further discussed below. Also shown at the bottom of the expansion gaps 272 is a base wall 274, which is more clearly shown in FIG. 32. FIG. 31 is a perspective view of the stopper of FIG. 30, which more clearly shows the central wall 278.

With reference again to FIGS. 30-32, it is clear that certain sections of the stopper 264 are solid from outer wall to outer wall, shown for example along lines 280, 282. However, other sections include voids or gaps for expansion, such as gaps 272. As such, when an IV spike penetrates the top wall 271, the central wall 278 is configured to expand into the gaps 272 while concurrently compress the ribs 268, which react thereto by bulging outwardly into the gaps 272. In reverse order, when the spike is removed from the central section 270, the solid sections 280, 282 of the stopper facilitates expansion of the central section 270 back to its original size to seal the void left by the spike. The sealing function may be further facilitated by housing the stopper inside a thermoplastic set port 246, which can further impart a compressive force on the stopper. This is readily seen by viewing the solid sections returning to their original positions.

In one alternative embodiment, self-lubricating oil is incorporated into the stopper to facilitate insertion of the spike through the central section 270. Exemplary self-lubricating oil is disclosed in Ser. No. 11/942,163, entitled Needleless Access Port Valves, filed Nov. 19, 2007, the contents of which are expressly incorporated herein by reference. According to the 163 application, a two-part system designed for liquid injection molding is available from Nusil Silicone Technology of Santa Barbara, Calif. Thus, an aspect of the present invention is the manufacturing of a stopper 264 using a mixture with self-lubricating properties. When A and B components are mixed together, which are sold by Nusil Silicone Technology in a two-part kit, in equal portions, the liquid will cure to a tough, rubbery elastomer via addition-cure chemistry. After about sixty minutes of molding elapsed time, the cured silicone rubber will begin to self-lubricate a silicone fluid from within the wall surface of the piston to the piston exterior surfaces. The fluid flows from within the wall to the interior and exterior surfaces of the piston whenever the piston is stressed or squeezed, such as when the piston is compressed and released within the valve housing. As the piston exudes lubricant to the surfaces, the mass or density of the piston reduces approximately an equal amount. The silicone oil therefore provides lubricating properties to decrease friction as the spike penetrates the stopper, and as the spike is removed from the stopper.

Additionally, as bacteria growth is a concern, an additional aspect of the present invention is the inclusion of antimicrobial metals into either part A or part B prior to introducing the two streams into a mixer to make the stopper. Exemplary antimicrobial metals include precious metals, such as silver, gold, platinum, copper, and zinc. Physiological antimicrobial metal compounds used herein include oxides and salts of preferably silver and also gold. These agents include silver acetate, silver benzoate, silver carbonate, silver citrate, silver chloride, silver iodide, silver nitrate, silver oxide, silver sulfadiazine, silver sulfate, gold chloride and gold oxide. Platinum compounds such as chloroplatinic acid or its salts (e.g., sodium and calcium chloroplatinate) may also be used. Alternatively, oxides and salts of copper and zinc such as those indicated above for silver may also be used. Preferred physiological antimicrobial metal compounds usable with the preferred piston of the present invention include silver acetate, silver oxide, ionic silver, silver sulfate, gold chloride, and a combination of silver oxide and gold chloride. In one exemplary embodiment, the agents are blended or mixed with stream A or stream B prior to combining the two streams in the mixer of the injection molding machine. The amount of antimicrobial agents is preferably in the range of 2% to 8% by wt/wt ratio of the combined stream.

Printing of product information, labeling, trademark, etc. on the containers discussed elsewhere herein may be accomplished by using pad printing or hot stamping techniques. Hot stamping is a process in which foil is transferred to a substrate, such as the container surface, using heat, pressure and length of time to press a heated die against the foil, which is in contact with the substrate and which is supported by a solid surface, such as an anvil. In pad printing, a soft silicone pad is used and, because of its unique properties, is able to pick the image to be printed from a flat plane and transfer it to a variety of surfaces, including flat, cylindrical, spherical, compound angles, textures, concave surfaces, and convex surfaces to name a few. In one embodiment, a filled container may be printed using pad printing. This may be accomplished by laying the container onto a support surface and stretching the container so that it is taut. The support surface is preferably arcuate so facilitate with the stretching. The silicone pad is further supported by a rigid surface having a corresponding arcuate surface. Pad printing and hot stamping techniques are well known in the art and further discussion is deemed unnecessary.

Although exemplary embodiments of the present invention have been shown and described, it will be appreciated by one of ordinary skill in the art that various modifications may be made without departing from the scope and spirit of the invention as defined in the claims below. For example, the exterior wall surfaces may include ridges for gripping or other aesthetic ridge/rib features, the sizes and shapes may be changed, and different materials may be used depending on the service and the contents of the containers. Furthermore, features or structures discussed for one container, such as having certain stoppers, creases, materials, nozzles, etc., may be used for other containers discussed elsewhere herein provided the features or structures are compatible. Accordingly, it is to be understood that the containers and their components constructed according to principles of this invention may be embodied other than as specifically described herein. The invention is also defined in the following claims.

What is claimed is:

1. A container for storing a fluid comprising:
a body section having a nozzle end opposite a base; the nozzle end comprising at least one nozzle attached to a terminal port comprising a housing having a stopper positioned therein; the stopper comprising:
a first end, a second end, an outer wall comprising a outer wall outer surface and an outer wall inner surface spaced from a central wall comprising a central wall outer surface and a central wall inner surface;
a gap defined by a space between the outer wall inner surface and the central wall outer surface;
a generally planar stopper surface covering the gap at the first end or the second end; and
a cavity defined by the central wall inner surface.

2. The container of claim 1, wherein said terminal port is a set port comprising a punctureable membrane located subjacent the generally planar stopper surface.

3. The container of claim 1, further comprising a second nozzle spaced from the at least one nozzle.

4. The container of claim 3, further comprising a web connecting the at least one nozzle and the second nozzle.

5. The container of claim 1, wherein the central wall defines a cavity sized to grip a spike.

6. The container of claim 1, further comprising a plurality of spaced apart ribs located in the gap.

7. The container of claim 1, wherein the stopper comprises a self-lubricating silicone material.

8. The container of claim 7, wherein the self-lubricating silicone material is impregnated with antimicrobial metals.

9. The container of claim 1, wherein the base comprises at least one extension comprising a base of a first dimension and a tip of a second smaller dimension.

10. The container of claim 1, wherein the central wall is expandable into the gap when an IV spike is inserted into the central wall inner surface.

11. A container for storing a fluid comprising:
a body section having a nozzle end opposite a base; the nozzle end comprising a first port a second port, a terminal port comprising a housing having a stopper positioned therein attached to the first port; the stopper comprising:
a first end, a second end, an outer wall comprising a outer wall outer surface and an outer wall inner surface spaced from a central wall comprising a central wall outer surface and a central wall inner surface;
a gap defined by a space between the outer wall inner surface and the central wall outer surface;
a generally planar stopper surface covering the gap at the first end or the second end;
a cavity defined by the central wall inner surface; and
wherein the body section has a depth that is less than a depth of the nozzle end.

12. The container of claim 11, wherein the body section has an hour-glass configuration when viewed along a side view.

13. The container of claim 11, wherein the body section has a perimeter and wherein the perimeter is subjected to a post molding manipulation process.

14. A container for storing a fluid comprising:
a body section having a depth and comprising a first layer in contact with a second layer a base, and a nozzle section having a depth comprising at least one nozzle comprising a puncturable membrane attached to a terminal port comprising a housing having a stopper positioned therein; said stopper comprising:
an outer wall, a central section, a central wall connected to the central section to define a central cavity, and a gap between the outer wall and the central wall; said gap being occupied by a plurality of spaced-apart ribs, each of said plurality of spaced-apart ribs being in contact with both the outer wall and the central wall; and
wherein the depth of the nozzle section is larger than the depth of the body section.

15. The container of claim 14, further comprising a second nozzle spaced apart from the at least one nozzle and having a web therebetween.

16. The container of claim 14, further comprising wherein a top wall fixed axially relative to the ribs and the central wall and wherein the top wall is punctured before the central wall can expand radially.

17. The container of claim 14, wherein a base wall connects the central wall to the outer wall.

18. The container of claim 14, wherein the stopper is made from a self-lubricating silicone material.

19. The container of claim 18, wherein the self-lubricating silicone material is impregnated with antimicrobial metals.

20. The container of claim 14, wherein the base comprises a plurality of creases.

* * * * *

UNITED STATES PATENT AND TRADEMARK OFFICE
CERTIFICATE OF CORRECTION

Page 1 of 2

PATENT NO.         : 8,992,502 B2
APPLICATION NO.    : 13/658622
DATED              : March 31, 2015
INVENTOR(S)        : Steve Smith et al.

It is certified that error appears in the above-identified patent and that said Letters Patent is hereby corrected as shown below:

In The Specification

In column 1, line 30, delete "access." and insert -- access, --, therefor.

In column 2, line 63, delete "surface:" and insert -- surface; --, therefor.

In column 4, line 58, delete "100 mL." and insert -- 100 mL, --, therefor.

In column 5, line 8, delete "fowled" and insert -- formed --, therefor.

In column 5, line 11, delete "drug delivery" and insert -- drug delivery, --, therefor.

In column 6, line 47, delete "(EPDM)." and insert -- (EPDM), --, therefor.

In column 6, line 47, delete "SANOPRENE™," and insert -- SANTOPRENE™, --, therefor.

In column 7, line 26, delete "71. The" and insert -- 71, the --, therefor.

In column 7, line 61, delete "10/571.985," and insert -- 10/571,985, --, therefor.

In column 8, line 19, delete "discussed" and insert -- discussed, --, therefor.

In column 8, line 30, delete "102. The" and insert -- 102, the --, therefor.

In column 9, line 43-44, delete "Accordingly. In" and insert -- Accordingly, in --, therefor.

In column 10, line 43, delete "appeal" and insert -- appeal, --, therefor.

In column 11, line 46, delete "below," and insert -- below --, therefor.

In column 11, line 52-53, delete "embodiment" and insert -- embodiment, --, therefor.

In column 11, line 59, delete "are is" and insert -- are --, therefor.

In column 11, line 60, delete "270° F." and insert -- 270° F., --, therefor.

In column 12, line 20, delete "3/64 to 1/16'" and insert -- 3/64" to 1/16" --, therefor.

In column 12, line 34, delete "etc" and insert -- etc. --, therefor.

In column 12, line 48, delete "then" and insert -- than --, therefor.

In column 12, line 65, delete "shown" and insert -- shown, --, therefor.

In column 14, line 28, delete "this" and insert -- this, --, therefor.

Signed and Sealed this
Seventeenth Day of May, 2016

Michelle K. Lee
*Director of the United States Patent and Trademark Office*

CERTIFICATE OF CORRECTION (continued)
U.S. Pat. No. 8,992,502 B2

In column 14, line 66, delete "Thus." and insert -- Thus, --, therefor.

In column 15, line 32, delete "Consequently" and insert -- Consequently, --, therefor.

In column 15, line 57, delete "SANOPRENE™," and insert -- SANTOPRENE™, --, therefor.

In column 16, line 22, delete "280. 282" and insert -- 280, 282 --, therefor.

In column 16, line 35, delete "163" and insert -- '163 --, therefor.

In The Claims

In column 18, line 21, in claim 11, delete "port" and insert -- port, --, therefor.

In column 18, line 43, in claim 14, delete "layer" and insert -- layer, --, therefor.